(12) United States Patent
Lee et al.

(10) Patent No.: US 11,095,851 B2
(45) Date of Patent: Aug. 17, 2021

(54) ELECTRONIC DEVICE FOR IMPROVING QUALITY OF CALL AND OPERATION METHOD THEREOF

(71) Applicant: SAMSUNG ELECTRONICS CO., LTD., Suwon-si (KR)

(72) Inventors: Hoonjae Lee, Suwon-si (KR); Yongtae Kim, Suwon-si (KR); Jeongyong Kim, Suwon-si (KR); Hyonmyong Cho, Suwon-si (KR); Taewon Do, Suwon-si (KR); Hyeyoung Jun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/034,468

(22) Filed: Sep. 28, 2020

(65) Prior Publication Data

US 2021/0105436 A1    Apr. 8, 2021

(30) Foreign Application Priority Data

Oct. 4, 2019 (KR) .................. 10-2019-0123290
Feb. 12, 2020 (KR) .................. 10-2020-0017249

(51) Int. Cl.
*H04N 7/14* (2006.01)
*H04L 29/06* (2006.01)

(52) U.S. Cl.
CPC ......... *H04N 7/147* (2013.01); *H04L 65/1069* (2013.01); *H04L 65/80* (2013.01)

(58) Field of Classification Search
CPC .................. H04N 7/14; H04L 29/06
(Continued)

(56) References Cited

U.S. PATENT DOCUMENTS

| 8,493,428 | B2 | 7/2013 | Choi |
| 2008/0090553 | A1 | 4/2008 | Wan et al. |

(Continued)

FOREIGN PATENT DOCUMENTS

| KR | 10-1589524 | | 1/2016 |
| KR | 10-2017-0094745 | A | 8/2017 |

OTHER PUBLICATIONS

Kuleshov et al., "Audio Super Resolution using Neural Networks", International Conference on Learning Representations (ICLR) 2017, Aug. 2, 2017, 8 pages.

(Continued)

*Primary Examiner* — Melur Ramakrishnaiah
(74) *Attorney, Agent, or Firm* — Nixon & Vanderhye P.C.

(57) ABSTRACT

An electronic device and an operation method of the electronic device according to various embodiments may include; a communication module comprising communication circuitry configured to transmit and/or receive data using a call channel established via a call connection to an external electronic device; and a processor, wherein the processor is configured to control the electronic device to: transmit a call connection request message to establish a call channel between an external electronic device and the electronic device; receive a response message from the external electronic device; based on capability information of the external electronic device related to the call connection and included in the response message, determine whether to pre-process a content transmitted via the call connection using a transmission filter configured to change a quality of the content; transmit, to the external electronic device, a call connection confirmation message indicating whether to pre-process the content; and control the communication module to complete establishing of the call channel, (Continued)

wherein the connection request message includes capability information of the electronic device related to the filter.

20 Claims, 18 Drawing Sheets

(58) Field of Classification Search
USPC .............................................. 348/14.01–14.16
See application file for complete search history.

(56) References Cited

U.S. PATENT DOCUMENTS

| | | | |
|---|---|---|---|
| 2008/0266377 A1* | 10/2008 | Kim | H04L 69/24 |
| | | | 348/14.02 |
| 2009/0231415 A1 | 9/2009 | Moore et al. | |
| 2010/0027417 A1 | 2/2010 | Franceschini | |
| 2010/0123769 A1 | 5/2010 | Cho | |
| 2011/0090950 A1* | 4/2011 | Bush | H04N 19/152 |
| | | | 375/240.02 |
| 2013/0322513 A1* | 12/2013 | Law | H04N 7/14 |
| | | | 375/240.01 |
| 2014/0064152 A1 | 3/2014 | Li et al. | |
| 2017/0237986 A1 | 8/2017 | Choi et al. | |
| 2019/0044984 A1* | 2/2019 | Chiang | H04L 65/403 |
| 2019/0356364 A1* | 11/2019 | Maamari | H04L 5/0062 |

OTHER PUBLICATIONS

Partial European Search Report dated Feb. 18, 2021 for EP Application No. 20199908.3.
PCT International Search Report dated Jan. 14, 2021 for PCT/KR2020/012809 (9pgs).

* cited by examiner

ELECTRONIC DEVICE FOR IMPROVING QUALITY OF CALL AND OPERATION METHOD THEREOF

CROSS-REFERENCE TO RELATED APPLICATIONS

This application is based on and claims priorities under 35 U.S.C. § 119 to Korean Patent Application No. 10-2019-0123290, filed on Oct. 4, 2019 and Korean Patent Application No. 10-2020-0017249, filed on Feb. 12, 2020, in the Korean Intellectual Property Office, the disclosures of which are incorporated by reference herein in their entireties.

BACKGROUND

Field

Various embodiments relate to an electronic device and an operation method of the electronic device.

Description of Related Art

Various electronic devices, such as smart phones, tablet PCs, portable multimedia players (PMPs), personal digital assistants (PDAs), laptop personal computers (PCs), and wearable devices are spreading.

Recently, an electronic device may provide a voice call or a video call based on an IP multimedia subsystem (IMS) or a rich communication suite (RCS). While providing high-quality audio or images, the electronic device may process transmitted or received audio or image data to reduce the size of the audio or video data. Processing of the audio data or image data may be implemented in two steps. As a step of processing audio raw data generated using a microphone and image raw data generated using a camera, there may be a step of reducing the size of the data while minimizing and/or reducing, using a filter, quality degradation, and a step of reducing the size of the data while compressing the audio data or the image data.

When a call is connected, a negotiation procedure based on a session description protocol (SDP) between electronic devices may be performed to configure an environment for the transmitted or received data, and a compression format for audio data or image data supportable between the electronic devices, and information of a sampling rate of the audio data or resolution of the image data may be exchanged during the negotiation procedure.

In order to improve the quality of audio data or image data to be transmitted or received, pre-processing, using a filter, for the audio data or image data may be performed before the audio data or the image data is encoded. Recently, due to the development of technologies related to artificial intelligence and machine learning or deep learning, and the emergence of a neural processing unit, the quality improvement of audio data or image data, using a filter, is being studied.

In an SDP-based negotiation procedure performed when a call is connected, data that is transmitted or received may not include information on the filter. Therefore, an electronic device may not know a filter that is used by an external electronic device, which is a counterpart of the call connection, to pre-process the audio data or the image data, and may not be able to quickly perform operations for improving an audio or image quality using the filter.

Alternatively, after the call is connected, in a situation where information on the filter is exchanged, the call may be temporarily stopped when configurations of components of the electronic device are changed due to activation of the filter.

The above information is presented as background information only to assist with an understanding of the disclosure. No determination has been made, and no assertion is made, as to whether any of the above might be applicable as prior art with regard to the disclosure.

SUMMARY

An electronic device according to various example embodiments may include; a communication module comprising communication circuitry configured to transmit and/or receive data using a call channel established via a call connection to an external electronic device; and a processor, wherein the processor is configured to control the electronic device to: transmit a call connection request message to establish a call channel between an external electronic device and the electronic device; receive a response message from the external electronic device; based on capability information of the external electronic device related to the call connection and included in the response message, determine whether to pre-process a content transmitted via the call connection using a transmission filter configured to change a quality of the content; transmit, to the external electronic device, a call connection confirmation message indicating whether to pre-process the content; and control the communication module to complete establishing the call channel, wherein the connection request message includes capability information of the electronic device related to the filter.

An electronic device according to various example embodiments may include: a communication module comprising communication circuitry configured to transmit and/or receive data using a call channel established via a call connection to an external electronic device; and a processor, wherein the processor is configured to control the electronic device to: receive a call connection request message to establish a call channel between an external electronic device and the electronic device; transmit, to the external electronic device, a response message including capability information of the electronic device related to a reception filter for pre-processing of a content received via the call connection; receive, from the external electronic device, a call connection confirmation message including an indicator indicating whether to pre-process the content using a transmission filter corresponding to the reception filter; and activate the reception filter based on the indicator.

An operation method of an electronic device according to various example embodiments may include: transmitting a call connection request message to establish a call channel between an external electronic device and the electronic device; receiving a response message from the external electronic device; based on capability information of the external electronic device related to the call connection and included in the response message, determining whether to pre-process a content transmitted via the call connection using a transmission filter configured to change a quality of the content; transmitting, to the external electronic device, a call connection confirmation message indicating whether to pre-process the content; and completing establishing the call channel, wherein the call connection request message includes capability information of the electronic device related to the transmission filter.

In an electronic device and an operation method of the electronic device according to various example embodiments, a negotiation procedure performed when a call is connected may include transmitting or receiving a call connection request message including information indicating processing of audio data or image data using a filter, or a response message, thereby enabling a filter used by an external electronic device to be checked. Therefore, high quality audio data or image data can be acquired using a filter corresponding to the filter used by the external electronic device.

In the electronic device and the operation method of the electronic device according to various example embodiments, the negotiation procedure performed when the call is connected may include transmitting or receiving the call connection request message including information indicating processing of the audio data or image data using the filter, or the response message thereby enabling the filter and associated elements to be activated before completion of the call connection. Therefore, after the call connection is completed, activation of the filter can prevent and/or reduce degradation of a call channel quality, which may occur, and can improve a quality of the call via the call channel.

In the electronic device and the operation method of the electronic device according to various example embodiments, the negotiation procedure performed when the call is connected may include exchanging whether a metadata-based video call is supported, model information used for the metadata-based video call, or standard information used to generate metadata, thereby enabling activation of elements supporting the metadata-based video call before the call connection is completed. Therefore, it may be possible to enter a video call mode in a relatively fast time.

The electronic device and the operation method of the electronic device according to various example embodiments may support a video call using metadata having a size smaller than that of a video or image stream, thereby enabling implementation of a video call using a smaller network bandwidth compared to a normal video call that exchanges a video or image stream.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
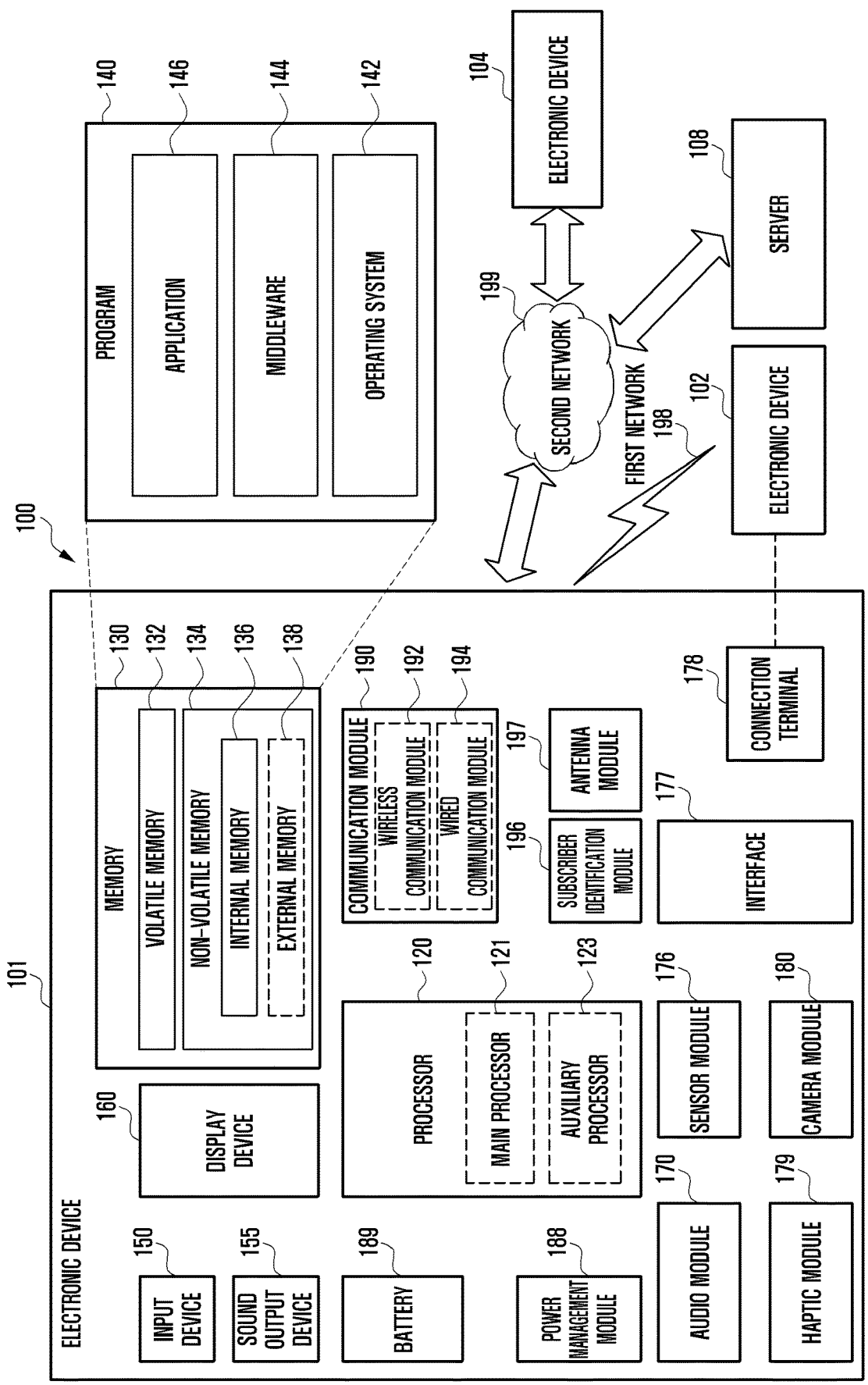
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
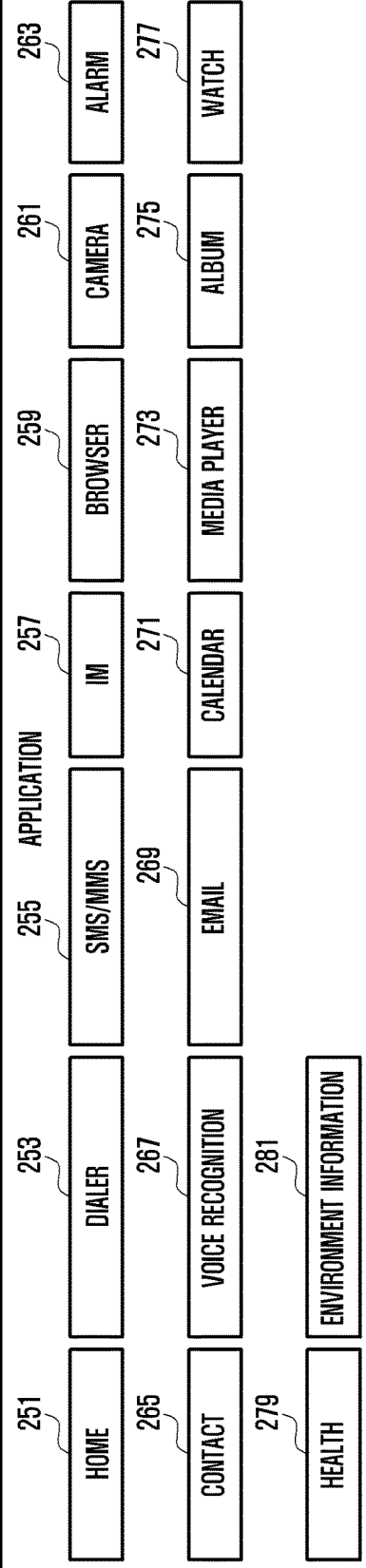
FIG. 2 is a block diagram illustrating an example program according to various embodiments.
Figure 2:
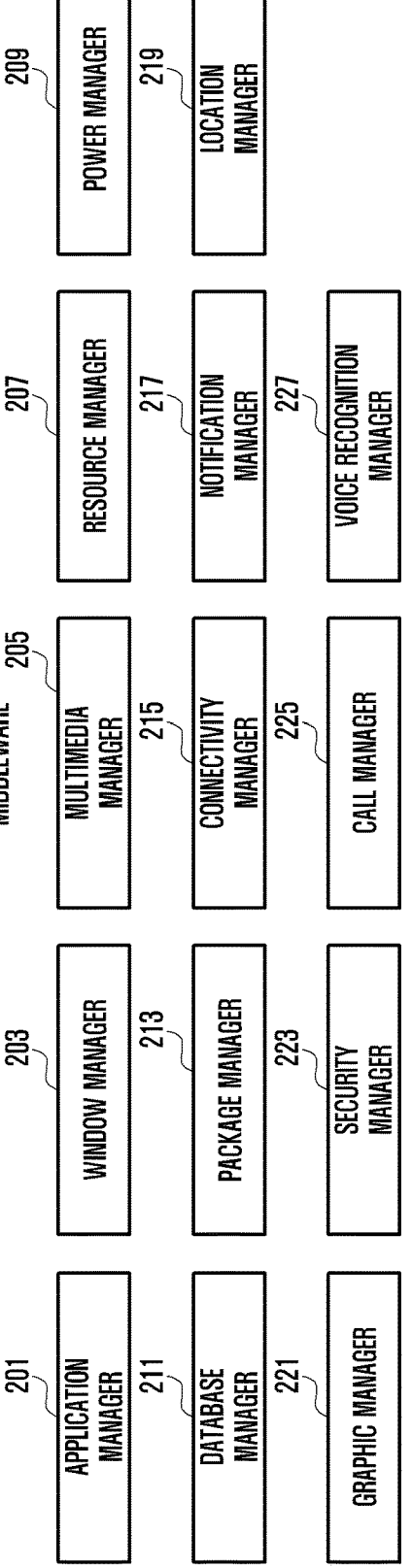

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bath™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3A:
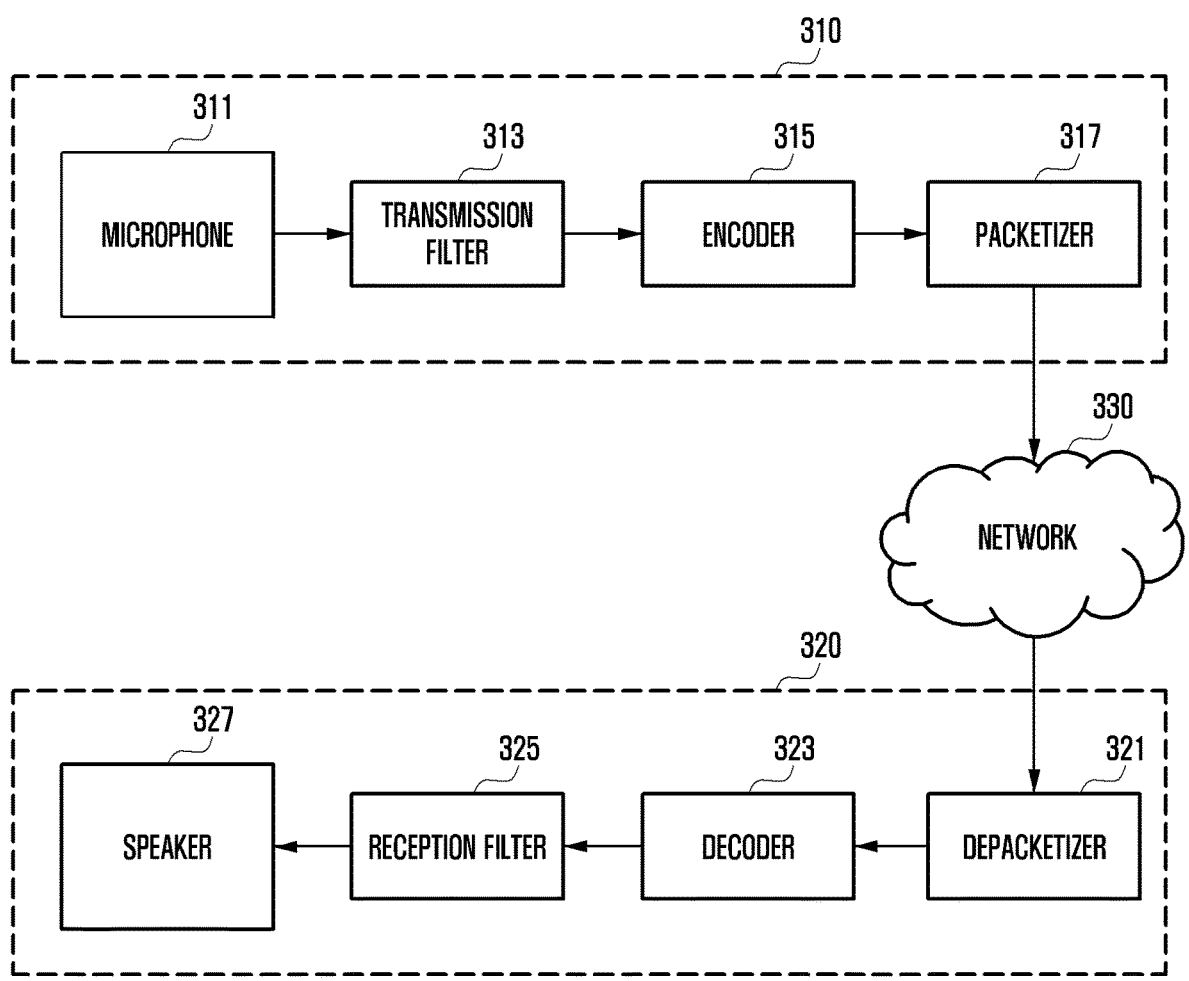
FIG. 3A is a block diagram illustrating an example in which a first electronic device and a second electronic device transmit or receive an audio content or an image content according to various embodiments.
Figure 3B:
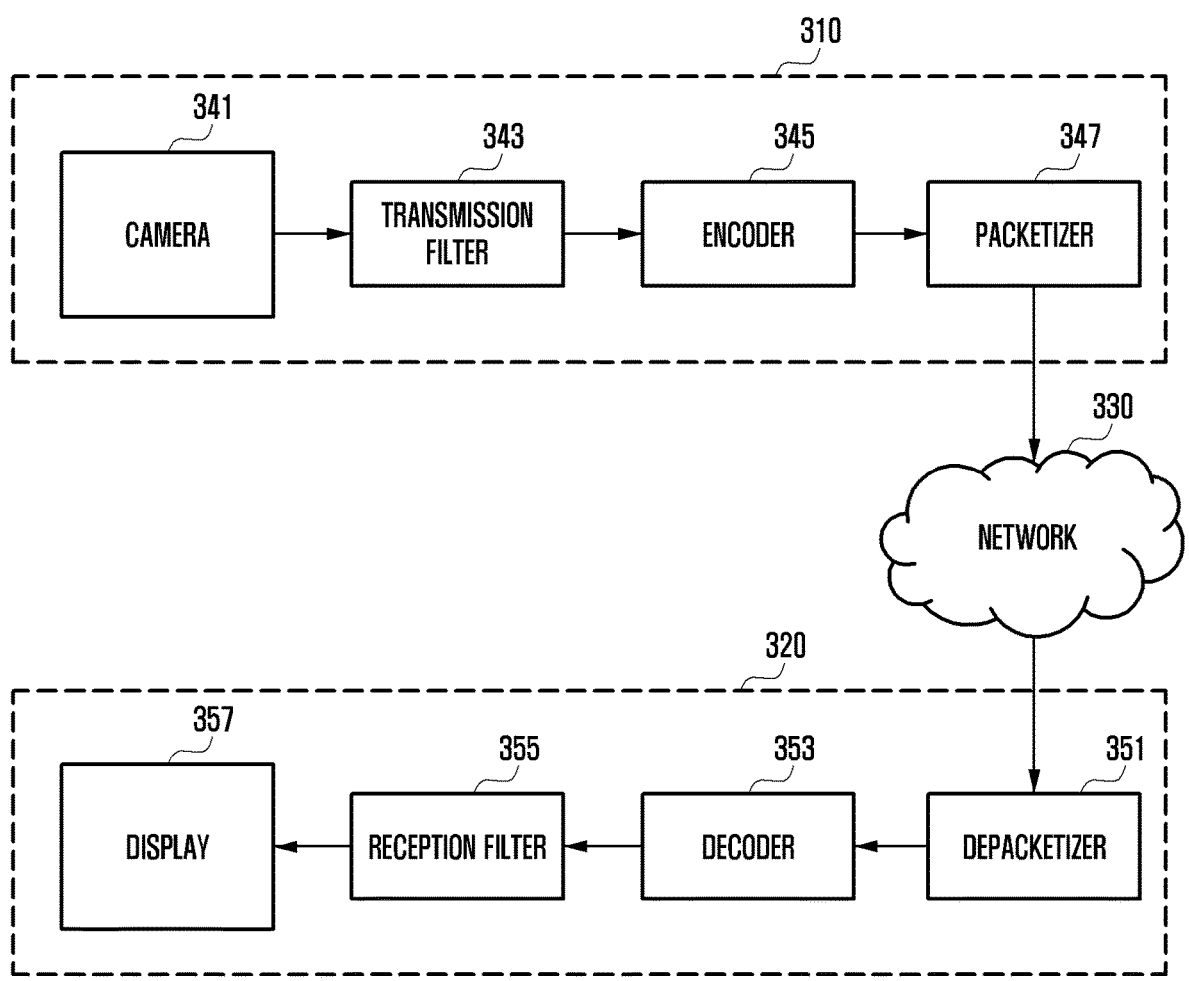
FIG. 3B is a block diagram illustrating an example in which a first electronic device and a second electronic device transmit or receive an audio content or an image content according to various embodiments.

FIG. 3A is a block diagram illustrating an example in which a first electronic device and a second electronic device transmit or receive an audio content or an image content according to various embodiments, and FIG. 3B is a block diagram illustrating an example in which a first electronic device and a second electronic device transmit or receive an audio content or an image content according to various embodiments.

According to various embodiments, a first electronic device 310 (e.g., the electronic device 101 of FIG. 1) and a second electronic device 320 (e.g., the electronic device 101 of FIG. 1) may perform a voice call and a video call based on various schemes (e.g., an IP multimedia subsystem (IMS) or a rich communication suite (RCS)). For the convenience of description, the first electronic device 310 may refer, for example, to a transmitting terminal, and the second electronic device 320 may refer, for example, to a receiving terminal. In order to determine a bit rate, a compression format (codec), or a quality (e.g., the quality may refer to a sampling rate in a case of audio data, and may refer to various variables representing the quality of audio data or image data, which include a resolution in a case of image data.) of audio data or image data transmitted or received when a call is connected, the first electronic device 310 and the second electronic device 320 may perform mutual negotiation using a scheme defined, for example, in a session description protocol (SDP). The first electronic device 310 and the second electronic device 320 may determine, via mutual negotiation, characteristics of audio data and/or image data to be transmitted, and may transmit or receive audio data or image data using the determined characteristics. Example embodiments of a mutual negotiation procedure for a call connection between the first electronic device 310 and the second electronic device 320 will be described in greater detail below with reference to FIG. 4 and FIG. 5.

FIG. 3A is a diagram illustrating an example of processing audio data between the first electronic device 310 and the second electronic device 320.

According to various embodiments, the first electronic device 310 may include a microphone 311 (e.g., the input device 150 of FIG. 1) of the first electronic device 310, which receives a user's voice, a transmission filter 313, an encoder 315 configured to encode audio data transmitted by the transmission filter 313 to compress the audio data, and a packetizer 317 configured to convert the encoded audio data into audio packet data in a packet form.

According to various embodiments, the transmission filter 313 may be configured to perform filtering on the user's audio data transmitted by the microphone 311. The transmission filter 313 may perform pre-processing (e.g., filtering) before the audio data generated by the microphone 311 is input to the encoder 315, to generate audio data having a lower sampling rate (e.g., downscale) than a sampling rate of the audio data generated by the microphone 311. The transmission filter 313 may generate audio data having a low sampling rate, and may transmit the generated audio data to the encoder 315, thereby reducing a size of the audio data to be transmitted to the second electronic device 320.

According to various embodiments, the transmission filter 313 may be implemented using various algorithms, and may generate an audio content having a relatively low sampling rate while maintaining, as much as possible, a quality of an audio content generated by the microphone 311.

According to various embodiments, the second electronic device 320 may include a depacketizer 321 configured to convert, into encoded audio data, an audio data packet received via a network 330, a decoder 323 configured to decode the encoded audio data which has been converted by the depacketizer 321, a reception filter 325 configured to change a sampling rate of the decoded audio data, and a speaker 327 (e.g., the audio output device 155 of FIG. 1) configured to output audio data generated by the reception filter.

According to various embodiments, the reception filter 325 may be configured to perform filtering on the decoded audio data generated by the decoder 323. The reception filter 325 may post-process (e.g., filtering) the decoded audio data, to generate audio data having a higher sampling rate (upscale) than a sampling rate corresponding to the decoded audio data. The reception filter 325 may generate an audio content having a higher sampling rate than the sampling rate corresponding to the decoded audio data, and may transmit the generated audio content to the speaker 327.

According to various embodiments, the reception filter 325 may be implemented using various algorithms, and may generate an audio content having a quality that is as similar as possible to the audio content generated by the microphone 311.

According to various embodiments, the transmission filter 313 and the reception filter 325 may include filters learned to maintain a quality of an original image as much as possible, and may be filters that are used by a neural processing unit of the electronic device 101 to process audio data or image data.

FIG. 3B is a diagram illustrating an example of processing image data between the first electronic device 310 and the second electronic device 320.

According to various embodiments, the first electronic device 310 may include a camera 341 (e.g., the camera module 180 of FIG. 1) configured to obtain image data including at least one still image, a transmission filter 343, an encoder 345 configured to encode image data transmitted by the transmission filter 343 to compress the image, and a packetizer 347 configured to convert the encoded image data into image data in a packet form.

According to various embodiments, the transmission filter 343 may be configured to perform filtering on the image data. The transmission filter 343 may perform pre-processing (e.g., filtering) before the image data generated by the camera 341 is input to the encoder 345, to generate image data having a lower resolution (e.g., downscale) than a resolution of the image data generated by the camera 341. The transmission filter 343 may generate image data having a relatively low resolution, and may transmit the generated image data to the encoder 345, thereby reducing a size of the image data to be transmitted to the second electronic device 320.

According to various embodiments, the transmission filter 343 may be implemented using various algorithms, and may generate image data having a relatively low resolution while maintaining, as much as possible, a quality of the image data generated by the camera 341.

According to various embodiments, the second electronic device 320 may include a depacketizer 351 configured to convert, into encoded image data, an image data packet received via the network 330, a decoder 353 configured to decode the encoded image data having been converted by the depacketizer 351, a reception filter 355 configured to change a resolution of the decoded image data, and a display 357 (e.g., the display device 160 of FIG. 1) configured to output the image data generated by the reception filter 355.

According to various embodiments, the reception filter 355 may be configured to perform filtering on the decoded image data generated by the decoder 353. The reception filter 355 may post-process (e.g., filtering) the decoded audio data, so as to generate image data having a higher resolution (upscale) than a resolution corresponding to the decoded audio data. The reception filter 355 may transmit, to the display 357, image data having a relatively high resolution.

According to various embodiments, the reception filter 355 may be implemented using various algorithms, and may generate image data having a quality that is as similar as possible to the image data generated by the camera 341.

According to various embodiments, the transmission filter 343 and the reception filter 355 may include filters learned to maintain a quality of an original audio as much as possible, and may be filters that are used by the neural processing unit of the electronic device 101 to process audio data or image data.

According to various embodiments, the transmission filters 313 and 343 and the reception filters 325 and 355 may be filters implemented using the same algorithm, and filtering on audio data or image data may be performed in a single pair. Operation of the transmission filters 313 and 343 and the reception filters 325 and 355 in a pair may refer, for example, to performing filtering on audio data or image data using filters implemented using the same algorithm. If the first electronic device 310 and the second electronic device 320 use the transmission filters 313 and 343 and the reception filters 325 and 355, which are implemented using the same algorithm, the second electronic device 320 may acquire a content having a quality similar to that of a content (e.g., audio data or image data) generated by the first electronic device 310.

According to various embodiments, if the first electronic device 310 and the second electronic device 320 acquire, before a call connection, information of the transmission filters 313 and 343 and the reception filters 325 and 355 or information on whether the transmission filters 313 and 343 and the reception filters 325 and 355 are supported, the first electronic device 310 and the second electronic device 320 may complete preparation for transmission or reception of a content before starting a call after the call-connection. If the first electronic device 310 and the second electronic device 320 acquire information on the transmission filters 313 and 343 and the reception filters 325 and 355 after the call connection, configurations of hardware-implemented elements may be changed to perform a call using the transmission filters 313 and 343 and the reception filters 325 and 355, and a call disconnection may occur due to changes in the configurations of the elements of the electronic device 101 during the call.

According to various embodiments, various elements (e.g., the transmission filters 313 and 343, the encoders 315 and 345, the packetizers 317 and 347, depacketizers 321 and 351, decoders 323 and 353, and the reception filters 325 and 355) included in the first electronic device 310 and the second electronic device 320 may be implemented in software or hardware or any combinations thereof (e.g., implemented in a circuit or a chip).

Hereinafter, an example embodiment, in which the first electronic device 310 and the second electronic device 320 acquire, before a call-connection, information on whether the transmission filter 313 and the reception filter 325 are supported, is described.

Figure 4A:
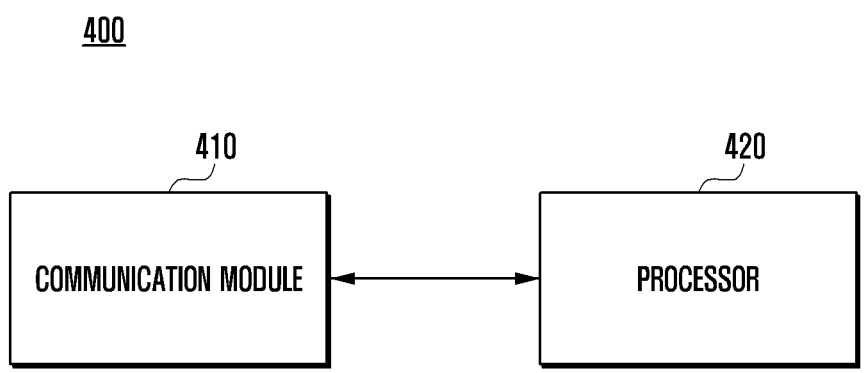
FIG. 4A is a block diagram illustrating an example electronic device according to various embodiments.

FIG. 4A is a block diagram illustrating an example electronic device according to various embodiments.

According to various embodiments, an electronic device 400 (e.g., the electronic device 101 of FIG. 1 or the first electronic device 310 of FIG. 3A and FIG. 3B) illustrated in FIG. 4A may include a communication module (e.g., including communication circuitry) 410 (e.g., the wireless communication module 192 of FIG. 1) and a processor (e.g., including processing circuitry) 420 (e.g., the processor 120 of FIG. 1).

According to various embodiments, the communication module 410 may include various communication circuitry and transmit audio data and/or image data using a communication channel (e.g., a cellular communication channel) established via a call connection to an external electronic device (e.g., the second electronic device 320 of FIGS. 3A and 3B).

According to various embodiments, the processor 420 may include various processing circuitry and perform negotiation with the external electronic device using a scheme defined in a session description protocol to determine characteristics of data transmitted or received when a call is connected between the external electronic device and the electronic device 400.

Hereinafter, it is assumed that the electronic device 400 corresponds to a transmission terminal (e.g., the first electronic device 310 of FIG. 3A), and an external electronic device corresponds to a second electronic device (e.g., the second electronic device 320 of FIG. 3A), and an example embodiment provides a description in which information on whether the transmission filter 313 and the reception filter 325 are supported is acquired before a call-connection.

According to various embodiments, the processor 420 may control the communication module 410, so that a call connection request message for establishment of a call channel between the external electronic device 320 and the electronic device 400 is transmitted from the external electronic device 320. For example, the call connection request message may be implemented in the form of an SDP invite message defined, for example, in SDP.

According to various embodiments, the call connection request message may include quality information of audio data or image data which could be transmitted by the electronic device 400. For example, the quality information of audio data may include a sampling rate of audio data that may be generated using a microphone (e.g., the microphone 311 of FIG. 3A), a sampling rate of audio data that can be transmitted over a network (e.g., the network 320 of FIG. 3A), or a sampling rate of audio data that can be received by the external electronic device. The quality information of image data may include a resolution of image data that may be generated using a camera (e.g., the camera 341 of FIG. 3B), a resolution of image data that can be transmitted over the network 320, or a resolution of image data that can be received by the external electronic device.

According to various embodiments, to determine, before a call connection is completed, whether the external electronic device 320, the transmission filters 313 and 343, and the reception filters 325 and 355 are supported, the processor 420 may control the electronic device 310 to transmit, to the external electronic device 320, the call connection request message including information on the transmission filters 313 and 343 and capability information of the electronic device 400, which is related to the transmission filters 313 and 343.

According to various embodiments, a call connection request message may include identification information of the transmission filters 313 and 343. The processor 420 may include the identification information of the transmission filters 313 and 343 in the call connection request message. The identification information of the transmission filters 313 and 343 may include, for example, and without limitation, at least one of model information of the transmission filters 313 and 343, version information, capability information including information on a maximum sampling rate of audio data that can be processed by the transmission filters 313 and 343; a maximum resolution of image data, or the like.

According to various embodiments, the call connection request message may include capability information of the electronic device 400, related to the transmission filters 313 and 343. The processor 420 may include the capability information of the electronic device 400, related to the transmission filters 313 and 343, in the call connection request message. The capability information of the electronic device 400, related to the transmission filters 313 and 343, may include information indicating whether audio data or image data can be pre-processed using the transmission filters 313 and 343. For example, the processor 420 may include, in the call connection request message, an indicator indicating that pre-processing of audio data or image data, using a specific algorithm may be supported. The pre-processing of audio data or image data, using the specific algorithm may refer, for example, to pre-processing before encoding the audio data or the image data using a transmission filter (e.g., the transmission filter 313 of FIG. 3A or the transmission filter 343 of FIG. 3B) implemented to be processed by a neural processing processor (NPU) of the electronic device 400.

According to various embodiments, the capability information of the electronic device 400, related to the transmission filters 313 and 343 may include information indicating whether the electronic device 400 has an element (e.g., a central processing device (CPU), a graphic processing device (GPU), or a neural processing device (NPU)) capable of pre-processing audio data or image data using the transmission filters 313 and 343. For example, the call connection request message may include an indicator indicating that a neural processing device capable of pre-processing the audio data or the image data using the transmission filters 313 and 343 is included. The call connection request message may include information of an element capable of pre-processing the audio data or the image data using the transmission filters 313 and 343. For example, information of the element capable of pre-processing the audio data or the image data may include capability and identification information of the element capable of pre-processing the audio data or the image data.

According to various embodiments, the processor 420 may transmit, to the external electronic device 320, the call connection request message including capability information of the electronic device, which is related to the transmission filters 313 and 343. The processor 420 may receive, from the external electronic device 320, a response message in response to the call connection request message. For example, the response message may be implemented in the form of an SDP 200 OK message defined in the SDP protocol.

According to various embodiments, the response message transmitted by the external electronic device 320 may include capability information of the external electronic device 320, which is related to the call connection. Based on the capability information of the electronic device 400, which is included in the call connection request message, the external electronic device 320 may select a data transmission scheme (e.g., a data transmission scheme supportable by the external electronic device 320, in a sampling scheme and a sampling rate of the audio data or a compression format and a resolution of the image data) which is supportable by the electronic device 400. Capability information of the external electronic device 320 may include information on the data transmission scheme selected by the external electronic device 320.

According to various embodiments, the capability information of the external electronic device 320 may include information on elements (e.g., software-implemented elements (e.g., the reception filter 325 of FIG. 3A and the reception filter 355 of FIG. 3B) or hardware-implemented elements (e.g., a neural processing unit)) capable of processing the pre-processed audio data or the pre-processed image data, which are generated by pre-processing the audio data or the image data, supported by the electronic device 400.

According to various embodiments, the processor 420 may determine whether to use the transmission filters 313 and 343, based on the capability information of the external electronic device 320, which is included in the response message. The processor 420 may pre-process data to be transmitted, using the transmission filters 313 and 343.

According to various embodiments, the processor 420 may transmit, to the external electronic device 320, a call connection confirmation message including an indicator that indicates whether to use the transmission filters 313 and 343.

According to various embodiments, the call connection confirmation message may be a message indicating to perform the call connection using the transmission scheme of the audio data or the image data, which is included in the response message.

According to various embodiments, the electronic device 400 may perform various operations for a call connection to the external electronic device 320 having received the call connection confirmation message, wherein the operations include, for example, and without limitation: activating the microphone 311 to generate audio data; activating the camera 341 to generate image data; activating an element (e.g., NPU) configured to pre-process the audio data or the image data, using the transmission filters 313 and 343; controlling the communication module 410 to transmit or receive data for call channel establishment; etc.

According to various embodiments, by including the capability information of the electronic device 400, which is related to the transmission filters 313 and 343, in the call connection request message, the processor 420 may activate the transmission filters 313 and 343 before the call connection to the external electronic device 320 is completed. Therefore, after the call connection is completed, activation of the transmission filters 313 and 343 may prevent degradation of a call channel quality, which may occur, or may improve a quality of the call using the call channel.

Figure 4B:
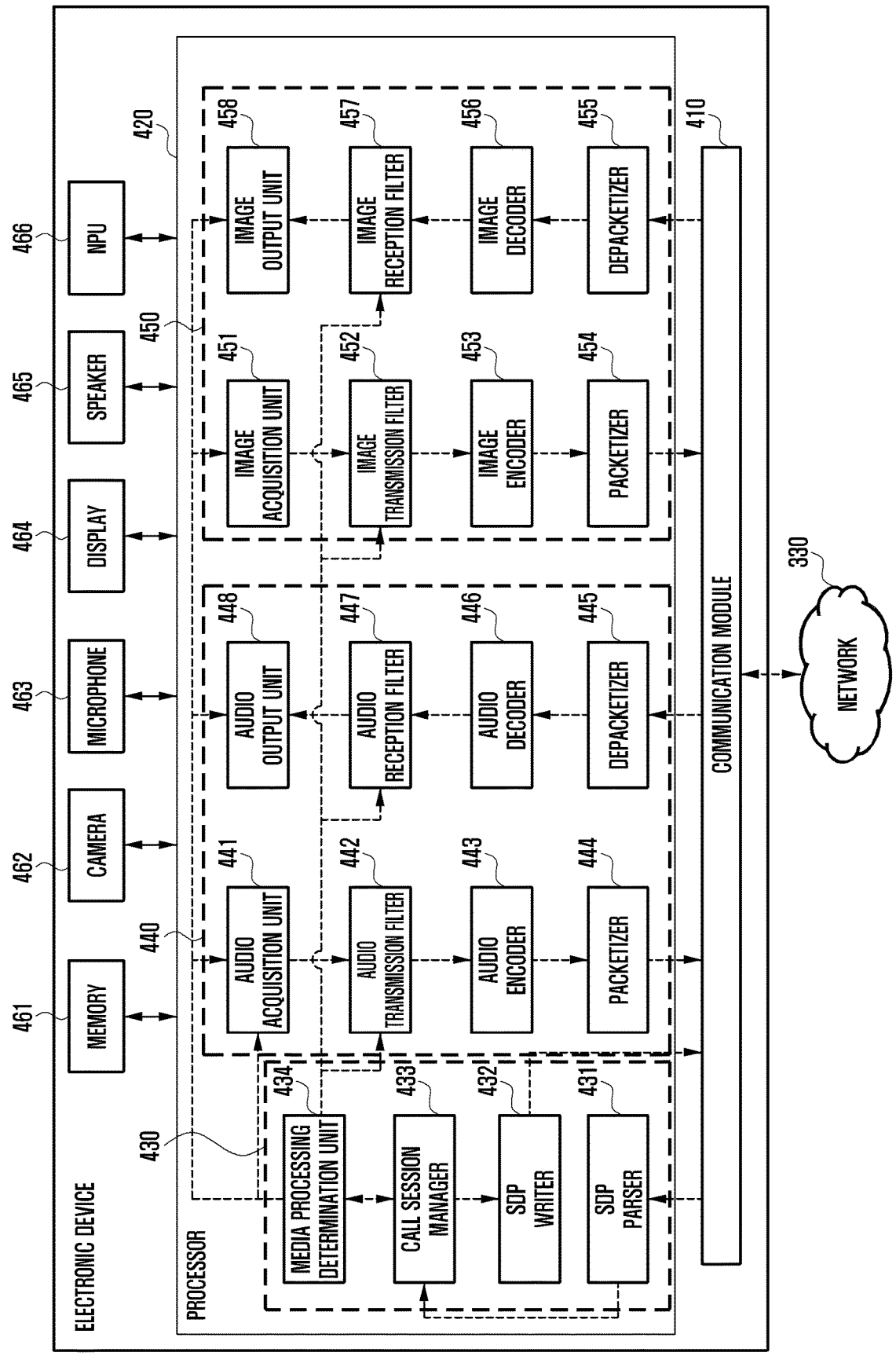
FIG. 4B is a block diagram illustrating an example electronic device according to various embodiments.

FIG. 4B is a block diagram illustrating an example electronic device according to various embodiments.

Referring to FIG. 4B, the electronic device 400 according to various embodiments may include a call connection manager (e.g., including processing circuitry and/or executable program elements) 430 configured to perform or manage a call connection, an audio data processor (e.g., including processing circuitry and/or executable program elements) 440 configured to transmit audio data or process the received audio data, an image data processor (e.g., including processing circuitry and/or executable program elements) 450 configured to transmit image data or process the received image data, a memory 461 (e.g., the memory 130 of FIG. 1), a camera 462 (e.g., the camera module 180 of FIG. 1), a microphone 463 (e.g., the input device 150) of FIG. 1), a display 464 (e.g., the display device 160 of FIG. 1), a speaker 465 (e.g., the sound output device 155 of FIG. 1), and a neural processing unit (e.g., including processing circuitry and/or executable program elements) 466.

According to various embodiments, the call connection manager 430 may include: an SDP parser 431 configured to parse a message received from an external electronic device (e.g., the second electronic device 320 of FIG. 3A and FIG. 3B) while a call connection is being performed; an SDP writer 432 configured to generate a message transmitted to the external electronic device 320, for performing of the call connection; a call session manager 433 configured to manage a connection or termination for a call session; and a media processing determination unit 434 configured to determine whether to process data using a specific filter, based on capability information of the external electronic device 320, which is included in a response message received from the external electronic device 320.

According to various embodiments, the audio data processor 440 in terms of transmitting audio data may include: an audio acquisition unit 441 configured to acquire audio data using the microphone 463; an audio transmission filter 442 (e.g., the transmission filter 313 of FIG. 3A) that is configured to perform filtering for audio data; an audio encoder 443 (e.g., the encoder 315 of FIG. 3A) configured to encode audio data, which is transmitted by the transmission filter 442, to compress the audio data; and a packetizer 444 (e.g., the packetizer 317 of FIG. 3A) configured to convert encoded audio data into audio packet data in a packet form.

According to various embodiments, the audio data processor 440 in terms of receiving audio data may include: a depacketizer 445 (e.g., the depacketizer 321 of FIG. 3A) configured to convert audio packet data received from the external electronic device 320 into encoded audio data; an audio decoder 446 (e.g., the decoder 323 of FIG. 3A) configured to decode encoded audio data; an audio reception filter 447 (e.g., the reception filter 325 of FIG. 3A) configured to change a sampling rate of decoded audio data; and an audio output unit 448 configured to output audio via the speaker 465.

According to various embodiments, the image data processor 450 in terms of transmitting image data may include: an image acquisition unit 451 configured to acquire an image captured by the camera 462; an image transmission filter 452 (e.g., the transmission filter 343 of FIG. 3B) that is configured to perform filtering for image data; an image encoder 453 (e.g., the encoder 345 of FIG. 3B) configured to encode image data to compress the image data; and a packetizer 454 (e.g., the packetizer 347 of FIG. 3B) configured to convert encoded image data into image packet data in a packet form.

According to various embodiments, the image data processor 450 in terms of receiving image data may include: a depacketizer 455 (e.g., the depacketizer 351 of FIG. 3B) configured to convert image packet data received from the external electronic device 320 into encoded image data; an image decoder 456 (e.g., the decoder 353 of FIG. 3B) configured to decode encoded image data which has been converted by the depacketizer 455; an image reception filter 457 (e.g., the reception filter 355 of FIG. 3B) configured to change a resolution of decoded image data; and an image output unit 458 configured to output, via the display 464, image data generated by the reception filter 457.

According to various embodiments, the SDP writer 432 may generate a call connection request message based on a control of the call session manager 433, and may transmit the call connection request message to the external electronic device 320 via the communication module 410. For example, the call connection request message may be implemented in the form of an SDP invite message defined in SDP.

According to various embodiments, a call connection request message may include, for example: information on the audio transmission filter 442 and the image transmission filter 452; an indicator configured to indicate whether pre-processing of the audio data or image data, using a specific algorithm (e.g., a pre-processing algorithm using NPU) is supportable; and capability information of the electronic device 400, which is related to the audio transmission filter 442 and the image transmission filter 452.

According to various embodiments, the SDP parser 431 may parse a response message received via the communication module 410. The response message may include capability information of the external electronic device 320, which is related to an audio reception filter (e.g., the reception filter 325 of FIG. 3A) and an image reception filter (e.g., the reception filter 355 of FIG. 3B) of the external electronic device 320. For example, the response message may include: an indicator configured to indicate whether post-processing that corresponds to pre-processing of audio data or image data using an included specific algorithm is supportable; and an indicator configured to indicate whether the electronic device 400 has an element (e.g., a central processing device (CPU), a graphic processing device (GPU), or a neural processing device (NPU)) capable of post-processing the audio data or the image data using the audio reception filter 325 and the image reception filter 355.

According to various embodiments, capability information of the external electronic device 320, which is extracted via parsing the response message by the SDP parser 431, may be transmitted to the media processing determination unit 434 via the call session manager 433.

According to various embodiments, the media processing determination unit 434 may determine, based on the capability information of the external electronic device 320, whether to pre-process the audio data using the audio transmission filter 442 or to pre-process the image data using the image transmission filter 452.

According to various embodiments, the media processing determination unit 434 may check the indicator indicating whether post-processing of the audio data or the image data using the algorithm included in the response message is supported, and may determine to pre-process the audio data or the image data using the specific algorithm.

According to various embodiments, the media processing determination unit 434 may check the capability information of the external electronic device 320, and may determine that the external electronic device 320 is to support pre-processing of the audio data or the image data using the specific algorithm.

According to various embodiments, the media processing determination unit 434 may activate the audio transmission filter 442, the image transmission filter 452, and an element (e.g., the NPU 466) configured to pre-process the audio data or the image data using the audio transmission filter 442 and the image transmission filter 452, in response to determination to pre-process the audio data or the image data.

According to various embodiments, the call session manager 433 may transmit a call connection confirmation message indicating whether to use the audio transmission filter 442 or the image transmission filter 452 to the external electronic device 320 via the communication module 410.

Hereinafter, an example embodiment in which, if the electronic device 400 corresponds to a reception terminal (e.g., the second electronic device 320 of FIG. 3A), information on whether the transmission filter 313 and the reception filter 325 are supported is acquired before a call connection is described.

According to various embodiments, elements implemented on the processor 420 of the electronic device 400 may be software-implemented elements, but some elements may be implemented in hardware according to a design scheme, or may include a combination of hardware and software.

Figure 5:
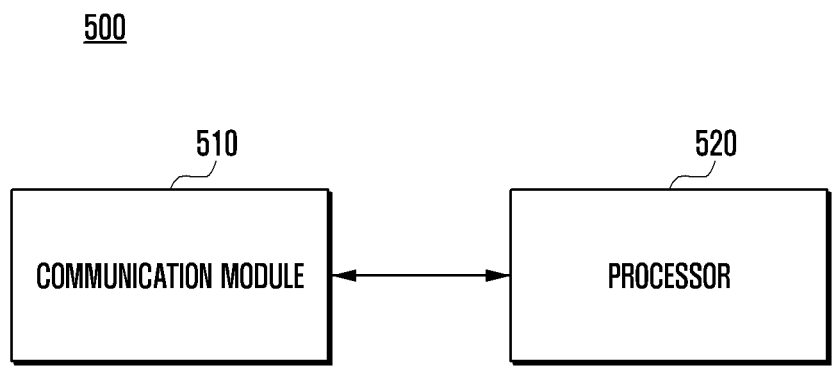
FIG. 5 is a block diagram illustrating an example electronic device according to various embodiments.

FIG. 5 is a block diagram illustrating an example electronic device according to various embodiments.

According to various embodiments, an electronic device 500 (e.g., the electronic device 101 of FIG. 1 or the first electronic device 320 of FIG. 3A and FIG. 3B) illustrated in FIG. 5 may include a communication module (e.g., including communication circuitry) 510 (e.g., the wireless communication module 192 of FIG. 1) and a processor (e.g., including processing circuitry) 520 (e.g., the processor 120 of FIG. 1).

According to various embodiments, the communication module 510 may include various communication circuitry and transmit audio data and/or image data using a communication channel (e.g., a cellular communication channel) established via a call connection to an external electronic device (e.g., the first electronic device 310 of FIGS. 3A and 3B).

According to various embodiments, the processor 520 may include various processing circuitry and perform negotiation with the external electronic device using a scheme defined in a session description protocol in order to determine characteristics of data transmitted or received when a call is connected between the external electronic device 310 and the electronic device 500.

According to various embodiments, the processor 520 may receive, from the external electronic device 310, a call connection request message for establishment of a call channel between the external electronic device 310 and the electronic device 500. For example, the call connection request message may be implemented in the form of an SDP invite message defined in SDP.

According to various embodiments, the call connection request message may be the same message as the call connection request message described in FIG. 4. As described in FIG. 4, the call connection request message may include capability information of the external electronic device 310, which is related to the transmission filters 313 and 343, and identification information of the transmission filters 313 and 343, which includes at least one among quality information of audio data or image data which can be transmitted by the external electronic device 310, model information of the transmission filters 313 and 343 of the external electronic device 310, version information, and capability information of the transmission filters 313 and 343.

According to various embodiments, the processor 520 may check the capability information of the external electronic device 310, which is included in the call connection request message, in response to reception of the call connection request message. The capability information of the external electronic device 310 may include information indicating whether pre-processing of the audio data or the image data using a transmission filter (e.g., the transmission filter 313 of FIG. 3A or the transmission filter 343 of FIG. 3B) implemented in the external electronic device 310 is supportable.

According to various embodiments, the processor 520 may determine whether the audio data or the image data can be post-processed using the reception filters 325 and 355 corresponding to the transmission filters 313 and 343, based on information indicating whether the audio data or the image data can be pre-processed using the transmission filters 313 and 343 included in the call connection request message. The processor 520 may check information on the transmission filters 313 and 343 included in the call connection request message, may determine whether the reception filters 325 and 355 corresponding to the transmission filters 313 and 343 implemented on the processor 520 are present, and may determine whether the audio data or the image data can be post-processed using the reception filters 325 and 355, in response to determining that the reception filters 325 and 355 corresponding to the transmission filters 313 and 343 are present.

According to various embodiments, based on the capability information of the external electronic device 310, which is included in the call connection request message, the processor 520 may select a data transmission scheme (e.g., a data transmission scheme supportable by the electronic device 500, in a sampling scheme and a sampling rate of the audio data or a compression format and a resolution of the image data) which is supportable by the external electronic device 310.

According to various embodiments, the processor 520 may control the electronic device 500 to transmit a response message including information on the selected data transmission scheme to the external electronic device 310. For example, the response message may be implemented in the form of an SDP 200 OK message defined in the SDP protocol.

According to various embodiments, the information on the data transmission scheme, which is included in the response message may include capability information of the electronic device 500, which is related to a reception filter (e.g., the reception filter 325 of FIG. 3A or the reception filter 355 of FIG. 3B) configured to post-process reception data or audio data received after the call connection in order to adjust qualities of the reception data or the audio data.

According to various embodiments, the response message may include an indicator indicating that the audio data or the image data may be post-processed using a specific algorithm.

According to various embodiments, the response message may include the capability information of the electronic device 500, which is related to the reception filters 325 and 355. According to various embodiments, the capability information of the electronic device 500, which is related to the reception filters 325 and 355 may include an indicator that indicates whether the electronic device 500 has an element (e.g., a central processing device (CPU), a graphic processing device (GPU), or a neural processing device (NPU)) capable of post-pressing the audio data or the image data using the reception filters 325 and 355. For example, the response message may include an indicator indicating that a neural processing device capable of post-processing the audio data or the image data using the reception filters 325 and 355 is included. The response message may include information of an element capable of post-processing the audio data or the image data using the reception filters 325 and 355. For example, information of the element capable of post-processing the audio data or the image data may include capability and identification information of the element capable of post-processing the audio data or the image data.

According to various embodiments, the processor 520 may receive, from the external electronic device 310, a call connection confirmation message including an indicator that indicates whether to use the transmission filters 325 and 355 of the external electronic device 310. The processor 520 may perform various operations (activating the reception filters 325 and 355 and associated elements, and controlling the communication module 510 to transmit or receive data for call channel establishment) for the call connection in response to confirming that the external electronic device 310 uses the transmission filters 313 and 343.

According to various embodiments, the processor 520 may transmit the capability information of the electronic device 500 to the external electronic device 320 in a call connection negotiation procedure. Therefore, the processor 520 may activate the reception filters 325 and 355 before the call connection to the external electronic device 320 is completed. Therefore, after the call connection is completed, operation of the reception filters 325 and 355 may prevent degradation of a call channel quality, which may occur, or may improve a quality of the call using the call channel.

Figure 6:
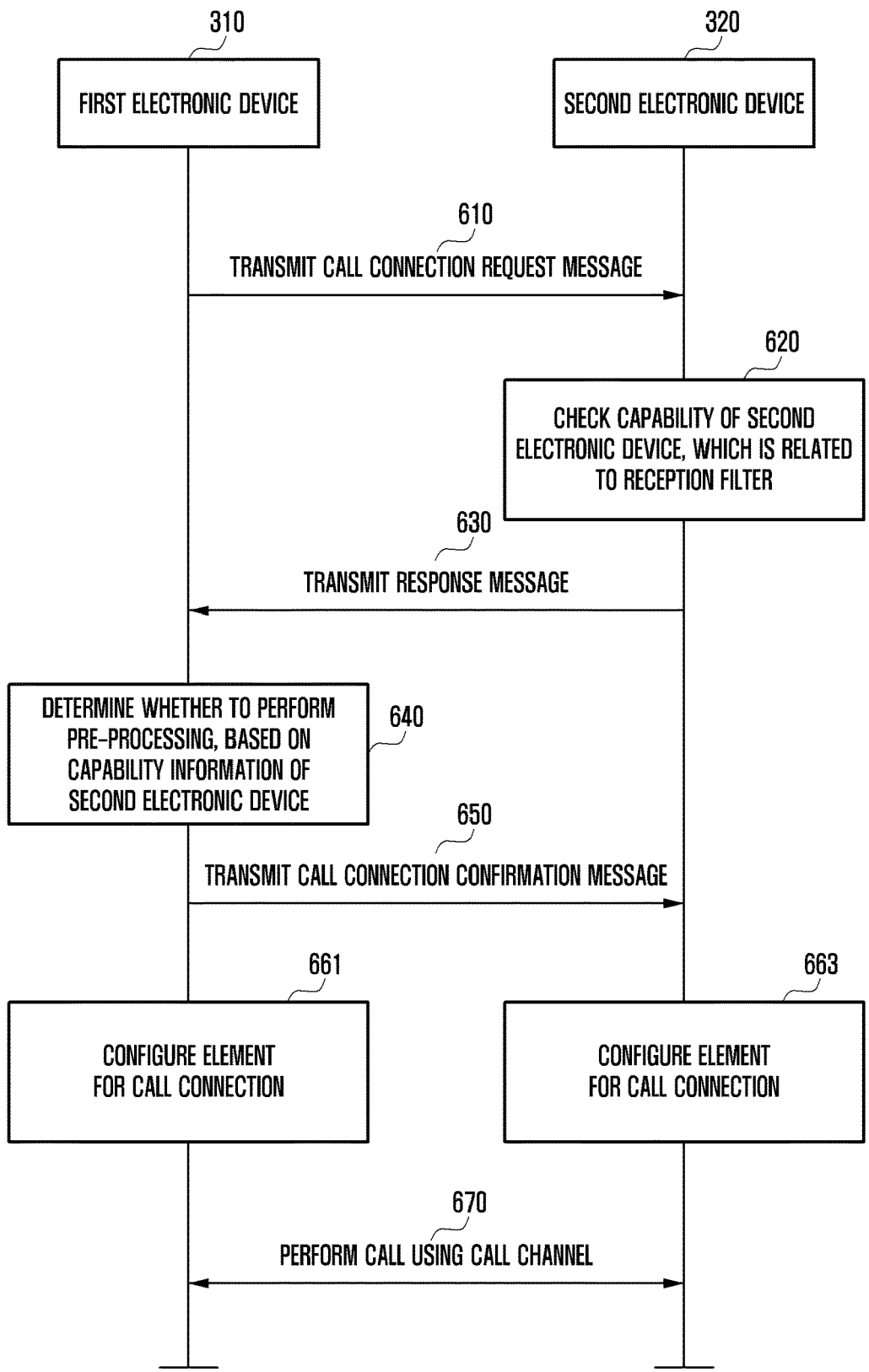
FIG. 6 is an operation flow diagram illustrating example operations of performing a call connection by the first electronic device and the second electronic device according to various embodiments.

FIG. 6 is an operation flow diagram illustrating example operations of performing a call connection by the first electronic device and the second electronic device according to various embodiments.

A first electronic device (e.g., the first electronic device 310 of FIG. 3A and FIG. 3B or the electronic device 400 of FIG. 4) according to various embodiments may transmit a call connection request message (e.g., the SDP invite message defined in the SDP session protocol) to a second electronic device (e.g., the second electronic device 320 of FIG. 3A and FIG. 3B or the electronic device 500 of FIG. 5) in operation 610.

According to various embodiments, in order to determine, before a call connection is completed, whether the second electronic device 320 supports the transmission filters 313 and 343 and the reception filters 325 and 355, the first electronic device 310 may transmit, to the second electronic device 320, the call connection request message including information of the transmission filters 313 and 343, an indicator indicating whether pre-processing of audio data or image data using a specific algorithm (e.g., a pre-processing algorithm using the NPU) is supportable, and capability information of the electronic device 400, which is related to the transmission filters 313 and 343. For example, the call connection request message may be implemented in the form described, for example, in Table 1 below.

TABLE 1

[-->] INVITE
m=audio 7010 RTP/AVP 110 100 98
b=AS:42
a=rtpmap:110 EVS/16000
a=mediaproc:110 upmodel=voice_up_coeff_1.1;
downmodel=voice_down_coeff_1.1
a=audioattr:110 source [32000] send [16000] recv [16000] target [32000]
a=npu:ver2.0
a=rtpmap:100 AMR-WB/16000/1
a=mediaproc:100 upmodel=voice_up_coeff_1.1;
downmodel=voice_down_coeff_1.1
a=audioattr:100 source [32000] send [16000] recv [16000] target [32000]
a=npu:ver2.0
a=rtpmap:98 AMR/8000/1
......
m=video 7020 RTP/AVP 112 102 34
b=AS:1280
a=rtpmap:112 H265/90000
a=mediaproc:112 upmodel=video_up_coeff_1.02;
downmodel=video_down_coeff_1.02
a=npu:ver2.0
a=imageattr:112 source [x=1440, y=2560] send [x=720, y=1280]

TABLE 1-continued

```
    recv [x=720, y=1280] target [x=1440, y=2560]
a=rtpmap:102 H264/90000
a=mediaproc:102 upmodel=video_up_coeff_1.02;
   downmodel=video_down_coeff_1.02
a=npu:ver2.0
a=imageattr:102 source [x=960, y=1280] send [x=480, y=640]
    recv [x=480, y=640] target [x=960, y=1280]
a=rtpmap:34 H263/90000
a=imageattr:34 send [x=176,y=144] recv [x=176,y=144]
```

Referring to Table 1, the call connection request message may include: an indicator that indicates whether pre-processing of the audio data using the specific algorithm is supported (a=mediaproc); NPU information and whether processing using the neural processing unit (NPU) is supported (a=npu:ver2.0); identification information of the transmission filters 313 and 343 (upmodel=voice_up_coeff_1.1, upmodel=video_up_coeff_1.1); identification information of the reception filters 325 and 355 (downmodel=voice_down_coeff_1.1, downmodel=video_down_coeff_1.1); and quality information of the audio data or image data.

According to various embodiments, in operation 620, the second electronic device 320 may check capability of the second electronic device 320, which is related to a reception filter (e.g., the reception filter 325 of FIG. 3A or the reception filter 355 of FIG. 3B).

According to various embodiments, the second electronic device 320 may check transmission schemes of the audio data or the image data, which are supported by the first electronic device 310 and included in the call connection request message, and the second electronic device 320 may select at least one transmission scheme, which is supported by the second electronic device 320, from among the checked transmission schemes.

According to various embodiments, the second electronic device 320 may check the capability of the second electronic device 320, which is related to the reception filters 325 and 355 for supporting the selected transmission scheme.

According to various embodiments, the capability of the second electronic device 320, which is related to the reception filters 325 and 355 may include: whether post-processing that corresponds to pre-processing of the audio data or the image data using the specific algorithm included in the call connection request message is supportable; and whether the second electronic device 320 has an element (e.g., a central processing device (CPU), a graphic processing device (GPU), or a neural processing device (NPU)) capable of post-processing the audio data or the image data using the reception filters 325 and 355.

According to various embodiments, in operation 630, the second electronic device 320 may transmit a response message (e.g., an SDP 200 OK message defined in the SDP protocol) to the first electronic device 310.

According to various embodiments, the response message may include the capability of the second electronic device 320, which is related to the reception filters 325 and 355. For example, the response message may include: an indicator indicating whether post-processing that corresponds to pre-processing of the audio data or the image data using the included specific algorithm is supportable; and an indicator indicating whether the second electronic device 320 has an element (e.g., a central processing device (CPU), a graphic processing device (GPU), or a neural processing device (NPU)) capable of post-processing the audio data or the image data using the reception filters 325 and 355. For example, the response message may be implemented in the form described, for example, in Table 2 below.

TABLE 2

```
[<--] SIP/2.0 200 OK
m=audio 12350 RTP/AVP 100
b=AS:41
a=rtpmap: 100 AMR-WB/16000/1
a=mediaproc: 100 upmodel=voice_up_coeff_1.0;
   downmodel=voice_down_coeff_1.0
a=audioattr:100 source [32000] send [16000] recv [16000] target [32000]
a=npu:ver1.0
m=video 15490 RTP/AVP 102
b=AS:640
a=rtpmap:102 H264/90000
a=mediaproc:102 upmodel=nobias1.01; downmodel=basedown1.01
a=npu:ver1.0
a=imageattr:102 source [x=960, y=1280] send [x=480, y=640]
    recv [x=480, y=640] target [x=960, y=1280]
```

Referring to Table 2, the response message may include: an indicator that indicates whether post-processing of the audio data or the image data using the specific algorithm is supported (a=mediaproc); NPU information and whether processing using the neural processing unit (NPU) is supported (a=npu:ver2.0); identification information of the transmission filters 313 and 343 (upmodel=voice_up_coeff_1.1, upmodel=video_up_coeff_1.1); identification information of the reception filters 325 and 355 (downmodel=voice_down_coeff_1.1, downmodel=video_down_coeff_1.1); and quality information of the audio data and the image data.

According to various embodiments, in operation 640, the first electronic device 310 may determine whether to pre-process the audio data or the image data using the transmission filters 313 and 343, based on the capability information of the second electronic device 320.

According to various embodiments, whether to pre-process the audio data or the image data may refer, for example, to pre-processing the audio data or the image data using the transmission filters 313 and 343.

According to various embodiments, the first electronic device 310 may check an indicator indicating whether post-processing of the audio data or the image data using the specific algorithm included in the response message is supported, and the first electronic device 310 may determine to pre-process the audio data or the image data using the specific algorithm.

According to various embodiments, in operation 650, the first electronic device 310 may transmit a call connection confirmation message (e.g., an SDP ACK message defined in the SDP session protocol) to the second electronic device 320.

According to various embodiments, the call connection confirmation message may be a message indicating to perform the call connection using the transmission scheme of the audio data or the image data, which is included in the response message.

According to various embodiments, in operation 661, the first electronic device 310 may configure elements of the first electronic device 310, for the call connection.

According to various embodiments, the first electronic device 310 may configure the elements for the call connection, based on information (e.g., a sampling scheme of the audio data, a sampling rate of the audio data, a compression scheme of the image data, or a resolution of the image data)

on at least one transmission scheme supported by the second electronic device 320, which is included in the response message. The first electronic device 310 may configure the elements for the call connection via various operations including activating the microphone 311 to generate audio data, activating the camera 341 to generate image data, or controlling the communication module 410 to transmit or receive data for call channel establishment.

According to various embodiments, in operation 663, the second electronic device 320 may configure elements of the second electronic device 320, for the call connection.

According to various embodiments, the second electronic device 320 may configure the elements for the call connection, based on information (e.g., a sampling scheme of the audio data, a sampling rate of the audio data, a compression scheme of the image data, or a resolution of the image data) on at least one transmission scheme supported by the second electronic device 320, which is included in the response message. The second electronic device 320 may configure the elements for the call connection via various operations including activating the microphone 311 to generate audio data, activating the camera 341 to generate image data, or controlling the communication module 510 to transmit or receive data for call channel establishment.

According to various embodiments, in operation 670, the first electronic device 310 and the second electronic device 320 may complete the call connection and may perform a call using a call channel.

According to various embodiments, the first electronic device 310 and the second electronic device 320 may transmit and/or receive the audio data and/or the image data via the call channel. The first electronic device 310 and the second electronic device 320 may transmit the audio data or the image data, which is pre-processed using the transmission filters 313 and 343, or may post-process the received audio data or image data using the reception filters 325 and 355, so as to acquire audio data or image data having a quality similar to that of the original data or image data.

Figure 7:
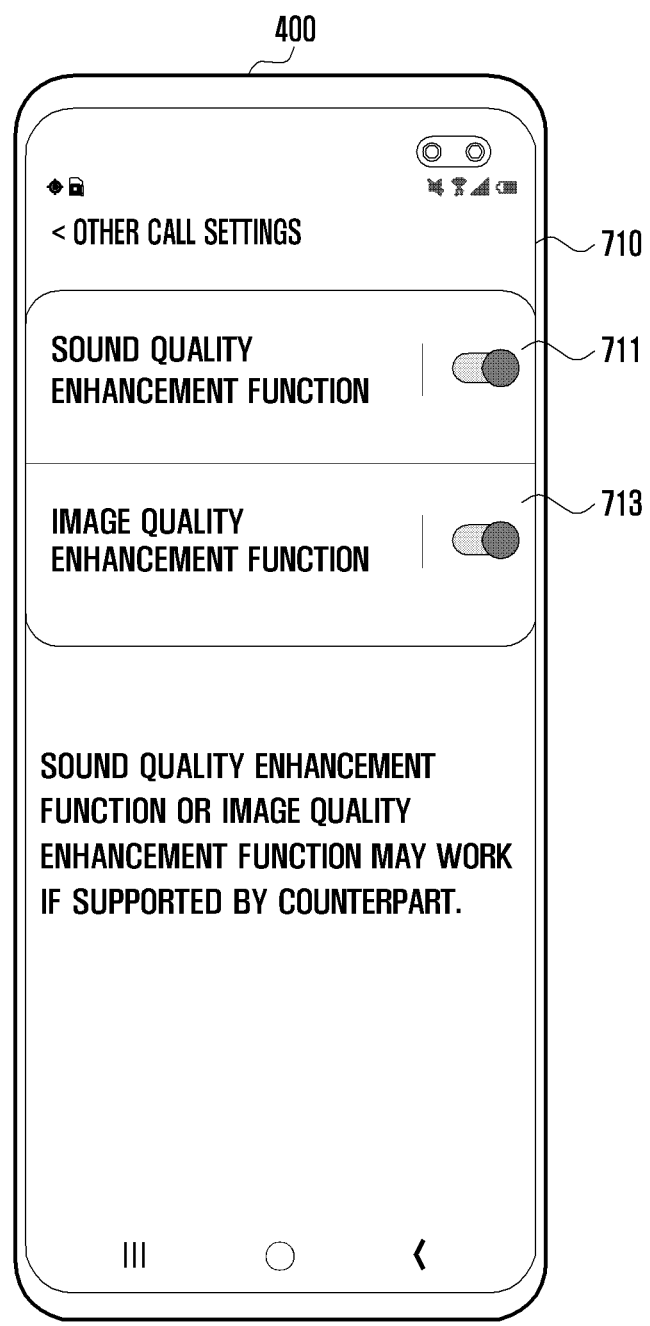
FIG. 7 is a diagram illustrating an example screen in which a configuration for content transmission or reception is performed, in a first electronic device and a second electronic device according to various embodiments.

FIG. 7 is a diagram illustrating an example screen in which a configuration for content transmission or reception is performed in an electronic device according to various embodiments.

According to various embodiments, a first electronic device (e.g., the first electronic device 310 of FIG. 6) and a second electronic device (e.g., the second electronic device 320 of FIG. 6) may transmit, to a counterpart electronic device, audio data or image data using an audio data or image data processing scheme using a specific algorithm. Filters (e.g., the transmission filters 313 and 343 of FIG. 3A and FIG. 3B, or the reception filters 325 and 355 of FIG. 3A and FIG. 3B) that pre-process or post-process audio data or image data may be generated via machine learning in order to exhibit high performance. The filters generated via machine learning may be used by a neural processing device of an electronic device. Processing of audio data or image data using the filters generated via machine learning may improve a sound quality or an image quality, but may increase power consumption.

An electronic device (e.g., the electronic device 400 of FIG. 4 or the electronic device 500 of FIG. 5) according to various embodiments may determine whether to pre-process or post-process audio data according to a user configuration.

Referring to FIG. 7, the electronic device 400 may display, on a display 710 (e.g., the display device 160 of FIG. 1), a screen enabling to select whether to apply a sound quality enhancement function 711 during a call connection, or whether to apply an image quality enhancement function 713 during the call connection. The electronic device 400 may determine whether to activate the sound quality enhancement function or the image quality enhancement function, based on a user input.

According to various embodiments, the electronic device 400 may determine whether to activate the sound quality enhancement function or the image quality enhancement function according to a state of the electronic device 400. For example, the electronic device 400 may determine to deactivate the sound quality enhancement function or the image quality enhancement function in response to determining that the remaining battery capacity is equal to or less than a preconfigured value. As another example, the electronic device 400 may determine to activate the sound quality enhancement function or the image quality enhancement function in response to determining that a quality of cellular communication used for the call connection has a value equal to or less than a preconfigured value.

An electronic device according to various example embodiments may include; a communication module comprising communication circuitry configured to transmit and/or receive data using a call channel established via a call connection to an external electronic device; and a processor, wherein the processor is configured to control the electronic device to: transmit a call connection request message to establish a call channel between an external electronic device and the electronic device; receive a response message from the external electronic device; based on capability information of the external electronic device related to the call connection and included in the response message, determine whether to pre-process a content transmitted via the call connection using a transmission filter configured to change a quality of the content; transmit, to the external electronic device, a call connection confirmation message indicating whether to pre-process the content; and control the communication module to complete establishing the call channel, wherein the connection request message includes capability information of the electronic device related to the filter.

In the electronic device according to various example embodiments, the capability information of the electronic device may include an indicator configured to indicate whether an element of the electronic device configured to process the transmission filter is present.

In the electronic device according to various example embodiments, elements of the electronic device may include a neural processing unit (NPU).

In the electronic device according to various example embodiments, the call connection request message may be configured to include identification information of the NPU.

In the electronic device according to various example embodiments, the call connection request message may be configured to include identification information of the transmission filter.

In the electronic device according to various example embodiments, the capability information of the electronic device may include a resolution or a sampling rate of a content that may be processed using the transmission filter.

In the electronic device according to various example embodiments, the call connection request message may include an indicator configured to indicate whether processing of the content based on the transmission filter is supported.

In the electronic device according to various example embodiments, the processor may be configured to determine, based on the response message, whether the reception filter corresponding to the transmission filter is present in the external electronic device, and determine whether to use the transmission filter, based on a result of the determination.

In the electronic device according to various example embodiments, the processor may be configured to control the electronic device to activate the transmission filter and an element to control the transmission filter before completion of the call connection in response to determining to use the transmission filter.

An electronic device according to various example embodiments may include: a communication module comprising communication circuitry configured to transmit and/or receive data using a call channel established via a call connection to an external electronic device; and a processor, wherein the processor is configured to control the electronic device to: receive a call connection request message to establish a call channel between an external electronic device and the electronic device; transmit, to the external electronic device, a response message including capability information of the electronic device related to a reception filter for pre-processing of a content received via the call connection; receive, from the external electronic device, a call connection confirmation message including an indicator indicating whether to pre-process the content using a transmission filter corresponding to the reception filter; and activate the reception filter based on the indicator.

In the electronic device according to various example embodiments, the capability information of the electronic device may include an indicator configured to indicate whether an element of the electronic device configured to process the reception filter, is present.

In the electronic device according to various example embodiments, elements of the electronic device may include a neural processing unit (NPU).

In the electronic device according to various example embodiments, the response message may be configured to include identification information of the reception filter.

In the electronic device according to various example embodiments, the response message may include an indicator configured to indicate whether processing of the content based on the reception filter is supported.

Figure 8:
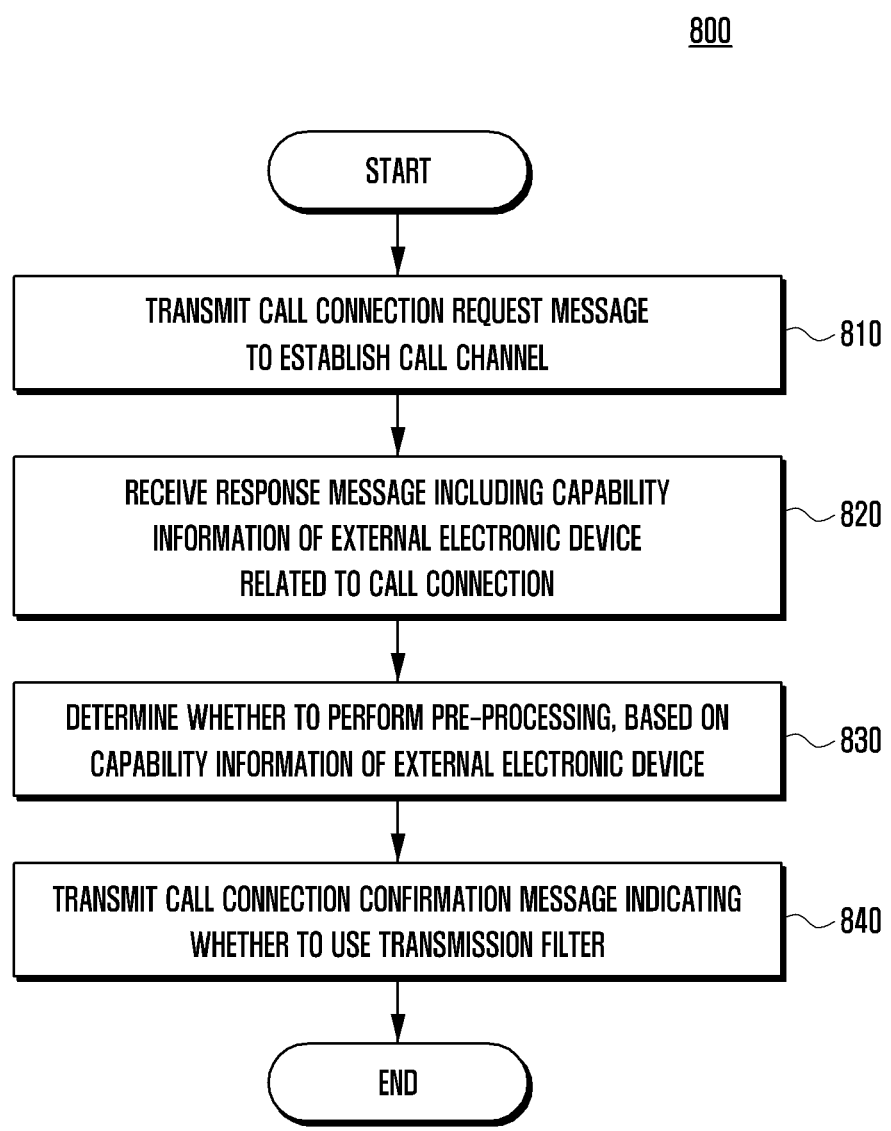
FIG. 8 is a flowchart illustrating an example operation method of an electronic device according to various embodiments.

FIG. 8 is a flowchart illustrating an example operation method of an electronic device according to various embodiments.

According to various embodiments, in operation 810, an electronic device (e.g., the electronic device 400 of FIG. 4) may transmit a call connection request message to establish a call channel to an external electronic device (e.g., the electronic device 500 of FIG. 5).

According to various embodiments, in order to determine, before a call connection is completed, whether the external electronic device 500 supports post-processing of audio data or image data using a specific algorithm, the electronic device 400 may transmit, to the external electronic device 500, the call connection request message including an indicator indicating whether pre-processing of audio data or image data using a specific algorithm (e.g., a pre-processing algorithm using the NPU) is supportable, and capability information of the electronic device 400, which is related to the transmission filters 313 and 343.

According to various embodiments, in operation 820, the electronic device 400 may receive, from the external electronic device 500, a response message including capability information of the external electronic device 500 related to the call connection.

According to various embodiments, the response message may include capability of the external electronic device 500 related to the reception filters 325 and 355. For example, the response message may include; an indicator indicating whether post-processing that corresponds to pre-processing of the audio data or the image data using the included specific algorithm is supportable; and an indicator indicating whether the external electronic device 500 has an element (e.g., a central processing device (CPU), a graphic processing device (GPU), or a neural processing device (NPU)) capable of post-processing the audio data or the image data using the reception filters 325 and 355.

According to various embodiments, in operation 830, the electronic device 400 may determine whether to pre-process a content (e.g., audio data or image data) based on the capability information of the external electronic device 500.

According to various embodiments, pre-processing of the content may refer, for example, to pre-processing the audio data or the image data using the transmission filters 313 and 343 before the content is input to an encoder (e.g., the encoder 315 of FIG. 3A or the encoder 345 of FIG. 3B).

According to various embodiments, the electronic device 400 may check an indicator indicating whether post-processing of the audio data or the image data using the specific algorithm included in the response message is supported, and the electronic device 400 may determine to pre-process the audio data or the image data using the specific algorithm.

According to various embodiments, the electronic device 400 may check the capability information of the external electronic device 500, and may determine that the external electronic device 500 is to support pre-processing of the audio data or the image data using the specific algorithm.

According to various embodiments, in operation 840, the electronic device 400 may transmit, to the external electronic device 500, a call connection confirmation message that indicates whether to use the transmission filters.

According to various embodiments, the call connection confirmation message may be a message indicating to perform the call connection using the transmission scheme of the audio data or the image data included in the response message.

Figure 9:
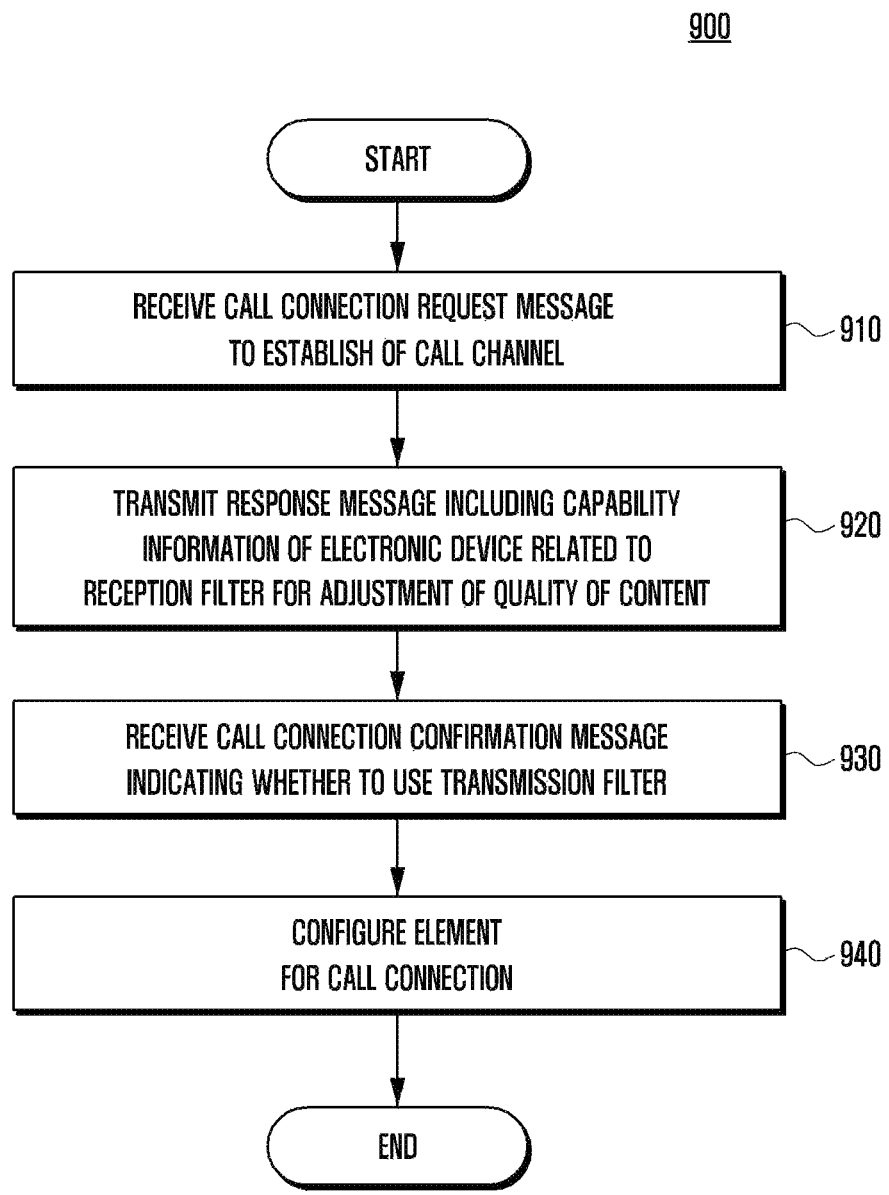
FIG. 9 is a flowchart illustrating an example operation method of an electronic device according to various embodiments.

FIG. 9 is a flowchart illustrating an example operation method of an electronic device according to various embodiments.

According to various embodiments, in operation 910, an electronic device (e.g., the electronic device 500 of FIG. 5) may receive a call connection request message to establish a call channel from an external electronic device (e.g., the electronic device 400 of FIG. 4).

According to various embodiments, the call connection request message may include quality information of audio data or image data which can be transmitted by the external electronic device 500, model information of the transmission filters 313 and 343 of the external electronic device 500, version information, identification information of the transmission filters 313 and 343, which includes capability information of the transmission filters 313 and 343, and capability information of the external electronic device 500, which is related to the transmission filters 313 and 343.

According to various embodiments, in operation 920, the electronic device 500 may transmit, to the external electronic device 400, a response message including capability information related to a reception filter for adjustment of a quality of a content (e.g., audio data or image data).

According to various embodiments, in operation 930, the electronic device 500 may receive a call connection confirmation message that indicates whether to use the transmission filters 313 and 343 of the external electronic device 400.

According to various embodiments, in operation 940, the electronic device 500 may configure elements of the electronic device 500, for the call connection.

According to various embodiments, the electronic device 500 may configure the elements for the call connection, based on information (e.g., a sampling scheme of the audio data, a sampling rate of the audio data, a compression scheme of the image data, or a resolution of the image data) on at least one transmission scheme supported by the electronic device 500, which is included in the response message. The electronic device 500 may configure the elements for the call connection via various operations including activating the microphone 311 to generate audio data, activating the camera 341 to generate image data, or controlling the communication module 510 to transmit or receive data for call channel establishment.

The embodiments described above are embodiments of acquiring, before a call connection between the first electronic device 310 and the second electronic device 320, information on whether the transmission filter 313 and the reception filter 325 are supported. According to various embodiments, a variety of information including whether to support the transmission filter 313 and the reception filter 325 may be acquired before the call connection. According to an embodiment, when performing a video call connection, the first electronic device 310 and the second electronic device 320 may acquire information including whether various schemes for a video call are supported, before the call connection. For example, the first electronic device 310 and the second electronic device 320 may acquire, before the call connection, information on whether to support a scheme (hereinafter, referred, for example to as a metadata-based video call) of performing a video call by exchanging data (or information) for rendering an image without transmitting the image, from among various schemes of performing the video call.

According to various embodiments, the metadata-based video call scheme may refer to a video call scheme of exchanging metadata, e.g., data for generating an emoji including an image. The metadata-based video call scheme may be a scheme of exchanging metadata having a size smaller than that of image data, which is output during a video call, without exchanging the image data. The electronic device having received the metadata may generate at least one frame including an emoji, which reflects characteristics (e.g., features) of the metadata, by a scheme of applying the metadata to an emoji model (e.g., 3D modeling data) stored in the electronic device. The electronic device may generate (e.g., render) image data including at least one frame, and may output the image data on a display (e.g., the display device 160 of FIG. 1). The emoji may, for example, be an image corresponding to a user of an electronic device (e.g., the first electronic device 310 and/or the second electronic device 320), and may be an image generated by a scheme of inputting metadata to modeling data stored in the electronic devices 310 and 320. The metadata-based video call scheme may reduce data used for a video call, by exchanging metadata having a size smaller than that of image data.

Hereinafter, a description of acquiring information related to a metadata-based video call before a call-connection between the first electronic device 310 and the second electronic device 320 will be described in greater detail.

Figure 10A:
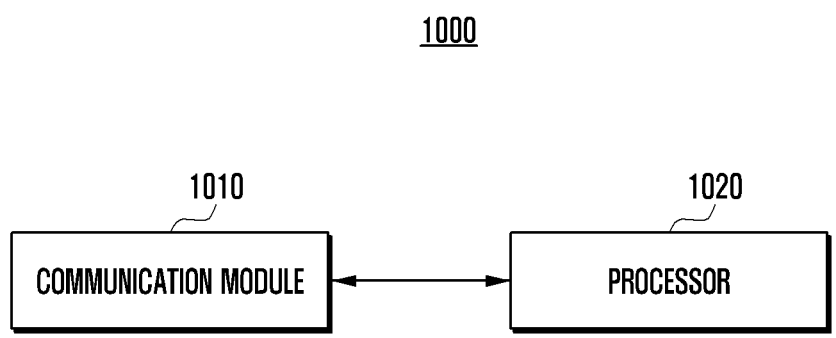
FIG. 10A is a block diagram illustrating an example electronic device according to various embodiments.

FIG. 10A is a block diagram of an electronic device according to various embodiments.

According to various embodiments, an electronic device 1000 (e.g., the electronic device 101 of FIG. 1, the first electronic device 310 of FIG. 3A and FIG. 3B, or the electronic device 400 of FIG. 4) illustrated in FIG. 10A may include a communication module (e.g., including communication circuitry) 1010 (e.g., the wireless communication module 192 of FIG. 1) and a processor (e.g., including processing circuitry) 1020 (e.g., the processor 120 of FIG. 1).

According to various embodiments, the communication module 1010 may include various communication circuitry and transmit audio data and/or image data using a communication channel (e.g., a cellular communication channel) established via a call connection to an external electronic device (e.g., the second electronic device 320 of FIGS. 3A and 3B).

According to various embodiments, the processor 1020 may include various processing circuitry and perform negotiation with the external electronic device using a scheme defined in a session description protocol in order to determine characteristics of data transmitted or received when a call is connected between the external electronic device and the electronic device 1000.

Hereinafter, it is assumed, for ease and convenience of description, that the electronic device 1000 corresponds to a transmission terminal (e.g., the first electronic device 310 of FIG. 3A), and an external electronic device corresponds to a second electronic device (e.g., the second electronic device 320 of FIG. 3A), and a specific embodiment, in which information on whether a metadata-based video call is supported is acquired before a call-connection, will be described.

According to various embodiments, the processor 1020 may activate a camera (e.g., the camera module 180 of FIG. 1) in response to detecting execution (or a user input to request a video call from the external electronic device 320 during execution of the video call application) of a video call application that performs a video call with the second electronic device 320, and may display a preview image collected using the camera 180 on a display (e.g., the display device 160 of FIG. 1).

According to various embodiments, the processor 1020 may control the communication module 1010, so that a call connection request message for establishment of a call channel between the external electronic device 320 and the electronic device 1000 is transmitted from the external electronic device 320. For example, the call connection request message may be implemented in the form of an SDP invite message defined in SDP.

According to various embodiments, the call connection request message may include quality information of audio data or image data which could be transmitted by the electronic device 1000. For example, the quality information of audio data may include a sampling rate of audio data that may be generated using a microphone (e.g., the microphone 311 of FIG. 3A), a sampling rate of audio data that can be transmitted over a network (e.g., the network 320 of FIG. 3A), or a sampling rate of audio data that can be received by the external electronic device. The quality information of image data may include a resolution of image data that may be generated using a camera (e.g., the camera 341 of FIG. 3B), a resolution of image data that can be transmitted over the network 320, or a resolution of image data that can be received by the external electronic device.

According to various embodiments, in order to determine, before a call connection is completed, whether the external electronic device 320 supports a metadata-based video call, the processor 1020 may transmit, to the external electronic device 320, the call connection request message including capability information of the electronic device 1000, which is related to whether the metadata-based video call is supported.

According to various embodiments, the capability information of the electronic device 1000 may include information indicating whether an element of the electronic device 1000, which is required in a metadata-based video call scheme, is present. According to an embodiment, the element of the electronic device 1000 may include at least one 3D model capable of rendering an emoji, and the capability information of the electronic device 1000 may include information indicating whether an emoji model (or a group of emoji models) is present in the electronic device 1000.

According to various embodiments, the call connection request message may include identification information of a model reflecting metadata required in the metadata-based video call scheme. The identification information of the model may include version information of the model (e.g., information indicating a type (e.g., person, animal, or alien) of an emoji that can be generated using metadata by the model), manufacturer information of the model, and standards (e.g., MPEG-4 face and body animation) used by the model.

According to various embodiments, the processor 1020 may receive, from the external electronic device 320, a response message in response to the call connection request message. For example, the response message may be implemented in the form of an SDP 200 OK message defined in the SDP protocol.

According to various embodiments, the response message transmitted by the external electronic device 320 may include capability information of the external electronic device 320, which is related to the call connection.

According to various embodiments, based on the capability information of the electronic device 1000, which is included in the call connection request message, the external electronic device 320 may select a data transmission scheme (e.g., a data transmission scheme supportable by the external electronic device 320, in a sampling scheme and a sampling rate of the audio data or a compression format and a resolution of the image data) which is supportable by the electronic device 1000. Capability information of the external electronic device 320 may include information on the data transmission scheme selected by the external electronic device 320.

According to various embodiments, the capability information of the external electronic device 320 may include information on elements (e.g., software-implemented elements (e.g., a model to reflect metadata) or hardware-implemented elements (e.g., a graphic processing unit (GPU), or any combination thereof) that support the metadata-based video call scheme performed between the external electronic device 320 and the electronic device 1000.

According to various embodiments, the processor 1020 may determine whether to perform the metadata-based video call, based on the capability information of the external electronic device 320, which is included in the response message.

According to various embodiments, the processor 1020 may check the capability information of the external electronic device 320, which is included in the response message, may determine whether the external electronic device 320 can support the metadata-based video call, or may check, if the metadata-based video call is supported, information of the model used for the metadata-based video call or standard information to be used for generating metadata that is to be used for the metadata-based video call.

According to various embodiments, the processor 1020 may transmit, to the external electronic device 320, a call connection confirmation message including an indicator that indicates whether the metadata-based video call is supported or an indicator that indicates whether to perform rendering using the metadata.

According to various embodiments, the call connection confirmation message may be a message indicating to perform the call connection using the transmission scheme of the audio data or the image data, which is included in the response message. The call connection confirmation message may be, for example, an SDP ACK message defined in the SDP session protocol.

According to various embodiments, the electronic device 1000 may perform various operations for a call connection to the external electronic device 320 having received the call connection confirmation message, wherein the operations include, for example: activating the microphone 311 to generate audio data; activating the camera 341 to generate image data; activating an image render (a graphic library and/or a graphic processing device (GPU)) to render image data that is to be output on a screen; activating the model for the metadata-based video call; or controlling the communication module 1010 to transmit or receive data for call channel establishment. Various operations for the call connection to the external electronic device 320, which are performed by the electronic device 1000 may be implemented using a function provided by a running video call application. Activating the model for the metadata-based video call by the electronic device 1000 may include, for example, loading a 3D model (modeling data), etc. stored in a nonvolatile memory 134, in a volatile memory 132 by the electronic device (e.g., the video call application 146 and an image renderer). According to various embodiments, by including the capability information of the electronic device 400, which is related to the metadata-based video call, in the call connection request message, the processor 1020 may activate, before the call connection to the external electronic device 320 is completed, an element (e.g., an image renderer and/or a 3D graphic model) necessary for performing the metadata-based video call. Therefore, after the call connection is completed, by activating the element necessary for performing the metadata-based video call, degradation of a call channel quality, which may occur, may be prevented, and by transmitting metadata having a size smaller than that of image data, data consumption used for the video call may be reduced.

Figure 10B:
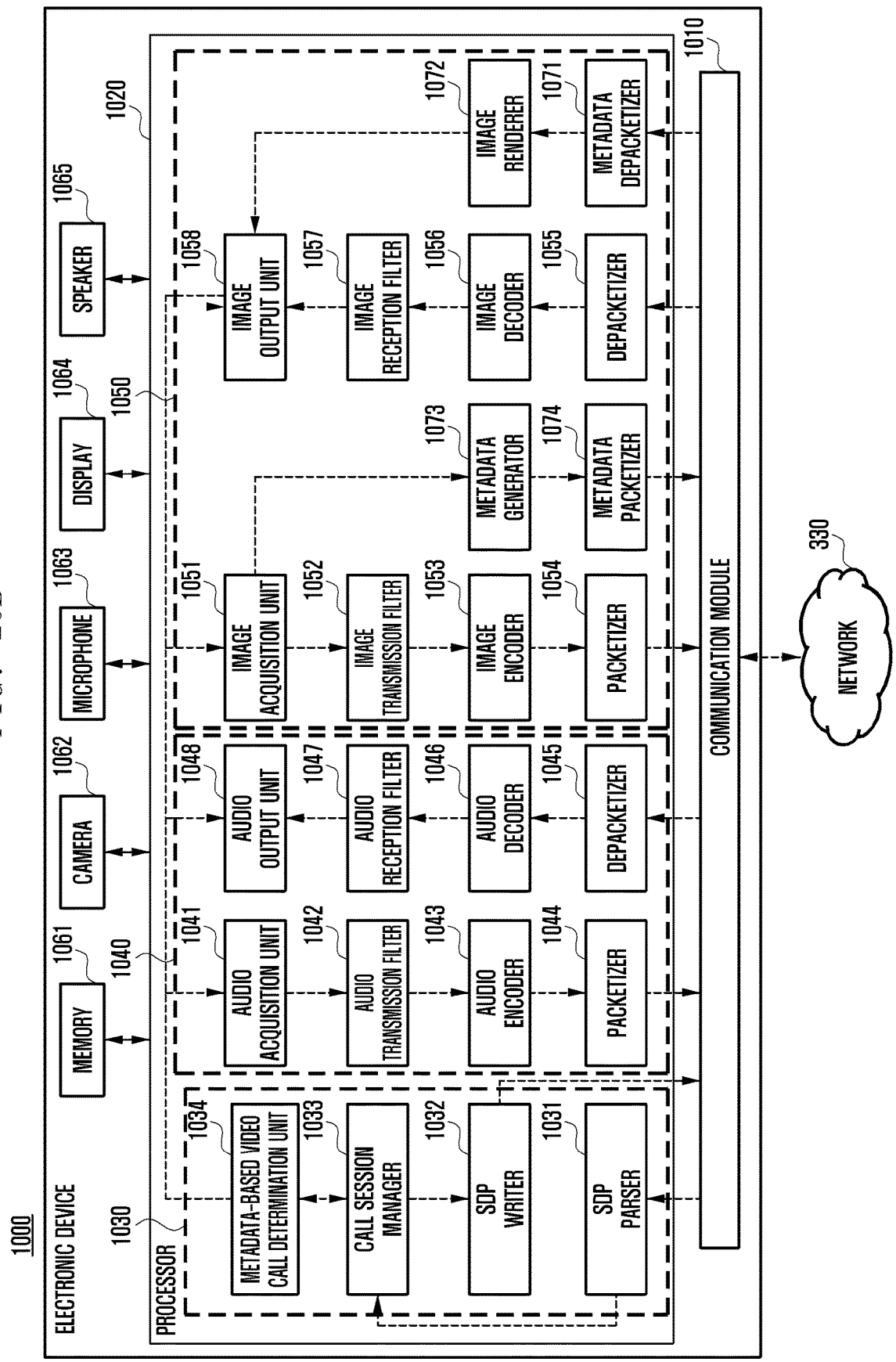
FIG. 10B is a block diagram illustrating an example electronic device according to various embodiments.

FIG. 10B is a block diagram illustrating an example electronic device according to various embodiments.

Referring to FIG. 10B, the electronic device 1000 according to various embodiments may include a call connection management unit (e.g., including processing circuitry and/or executable program elements) 1030 configured to perform or manage a call connection, an audio data processor (e.g., including processing circuitry and/or executable program elements) 1040 configured to transmit audio data or process the received audio data, an image data processor (e.g., including processing circuitry and/or executable program elements) 1050 configured to transmit image data or process the received image data, a memory 1061 (e.g., the memory 130 of FIG. 1), a camera 1062 (e.g., the camera module 180 of FIG. 1), a microphone 1063 (e.g., the input device (150) of FIG. 1), a display 1064 (e.g., the display device 160 of FIG. 1), and a speaker 1065 (e.g., the sound output device 155 of FIG. 1).

According to various embodiments, the call connection manager 1030 may include: an SDP parser 1031 configured to parse a message received from an external electronic device (e.g., the second electronic device 320 of FIG. 3A and FIG. 3B) while a call connection is being performed; an SDP writer 1032 configured to generate a message transmitted to the external electronic device 320, for performing of the call connection; a call session manager 1033 configured to manage a connection or termination for a call session; and a metadata-based video call determination unit 1034 configured to determine whether to perform a metadata-based video call, based on capability information of the external electronic device 320, which is included in a response message received from the external electronic device 320.

According to various embodiments, the audio data processor 1040 may include: an audio acquisition unit 1041 configured to acquire audio data using the microphone 1063; an audio transmission filter 1042 (e.g., the transmission filter 313 of FIG. 3A) that is configured to perform filtering for audio data; an audio encoder 1043 (e.g., the encoder 315 of FIG. 3A) configured to encode audio data, which is transmitted by the transmission filter 1042, to compress the audio data; and a packetizer 1044 (e.g., the packetizer 317 of FIG. 3A) configured to convert encoded audio data into audio packet data in a packet form.

According to various embodiments, the audio data processor 1040 in terms of receiving audio data may include: a depacketizer 1045 (e.g., the depacketizer 321 of FIG. 3A) configured to convert audio packet data received from the external electronic device 320 into encoded audio data; an audio decoder 1046 (e.g., the decoder 323 of FIG. 3A) configured to decode encoded audio data; an audio reception filter 1047 (e.g., the reception filter 325 of FIG. 3A) configured to change a sampling rate of decoded audio data; and an audio output unit 1048 configured to output audio via the speaker 465.

According to various embodiments, the image data processor 1050 in terms of transmitting image data may include: an image acquisition unit 1051 configured to acquire an image captured by the camera 1062; an image transmission filter 1052 (e.g., the transmission filter 343 of FIG. 3B) that is configured to perform filtering for image data; an image encoder 1053 (e.g., the encoder 345 of FIG. 3B) configured to encode image data to compress the image data; and a packetizer 1054 (e.g., the packetizer 347 of FIG. 3B) configured to convert encoded image data into image packet data in a packet form.

According to various embodiments, the image data processor 1050 in terms of receiving image data may include: a depacketizer 1055 (e.g., the depacketizer 351 of FIG. 3B) configured to convert image packet data received from the external electronic device 320 into encoded image data; an image decoder 1056 (e.g., the decoder 353 of FIG. 3B) configured to decode encoded image data which has been converted by the depacketizer 1055; an image reception filter 1057 (e.g., the reception filter 355 of FIG. 3B) configured to change a resolution of decoded image data; and an image output unit 1058 configured to output, via the display 464, image data generated by the reception filter 1057.

According to various embodiments, the SDP writer 1032 may generate a call connection request message based on a control of the call session manager 1033, and may transmit the call connection request message to the external electronic device 320 via the communication module 1010. For example, the call connection request message may be implemented in the form of an SDP invite message defined in SDP.

According to various embodiments, a call connection message may include capability information of the electronic device 400, which is related to the metadata-based video call.

According to various embodiments, the SDP parser 1031 may parse a response message received via the communication module 410. The response message may include the capability information of the external electronic device 320, which is related to the metadata-based video call. For example, the response message may include an indicator indicating whether the external electronic device 320 can support the metadata-based video call, and an element (e.g., an indicator indicating whether a metadata depacketizer 1071 configured to decode metadata or an image renderer 1072 configured to render metadata is provided) allowing the external electronic device 320 to perform the metadata-based video call.

According to various embodiments, the capability information of the external electronic device 320, which is extracted via parsing the response message by the SDP parser 1031, may be transmitted to the metadata-based video call determination unit 1034 via the call session manager 1033.

According to various embodiments, the metadata-based video call determination unit 1034 may determine whether to perform the metadata-based video call, based on the capability information of the external electronic device 320.

According to various embodiments, the metadata-based video call determination unit 1034 may check an indicator indicating whether the metadata-based video call is supported, which is included in the response message, and may determine whether the external electronic device 320 supports the metadata-based video call.

According to various embodiments, the metadata-based video call determination unit 1034 may determine that the external electronic device 320 supports the metadata-based video call, based on the capability information of the external electronic device 320, and may determine to perform the metadata-based video call, in response to determination that the external electronic device 320 supports the metadata-based video call.

According to various embodiments, the metadata-based video call determination unit 1034 may activate: a metadata generator 1073 configured to detect feature points from images acquired by elements (e.g., the image acquisition unit 1051) necessary for performing the metadata-based video call, in response to determination to perform the metadata-based video call, and generate metadata based on the feature points; a metadata packetizer 1074 configured to convert the metadata received from the metadata generator 1073 into packet data in a packet form; the metadata depacketizer 1071 configured to convert the metadata in the packet form, which is received from the external electronic device 320; or the image renderer 1072 configured to generate an image in a scheme of rendering the metadata.

According to various embodiments, the call session manager 1033 may transmit a call connection confirmation message indicating whether to activate the metadata-based video call, to the external electronic device 320 via the communication module 1010.

According to various embodiments, elements implemented on the processor 1020 of the electronic device 1000 may be software-implemented elements, but some elements may be implemented in hardware according to a design scheme. For example, the image renderer 1072 may be a graphic library which is software-implemented so as to be stored in a memory (e.g., the memory 130 of FIG. 1), and the image renderer 1072 may be a graphic processing unit (GPU) which may be hardware-implemented.

Figure 11A:
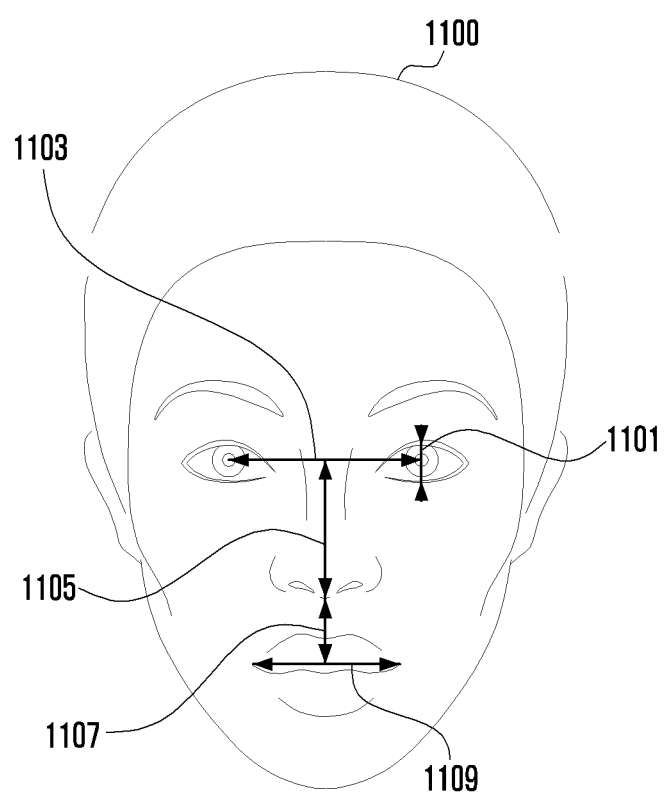
FIG. 11A is a diagram illustrating an example of extracting metadata from an acquired image, in an electronic device according to various embodiments.

FIG. 11A is a diagram illustrating an example of extracting metadata from an acquired image, in an electronic device according to various embodiments.

According to various embodiments, an electronic device (e.g., the electronic device 1000 of FIG. 10A) may analyze an image collected by a camera (e.g., the camera 1062 of FIG. 10B), and may extract feature points of one or more objects included in the image. For example, objects of a user's face may include eyebrows, eyes, a nose, a mouth, a tongue, or a face shape, and objects constituting a part of the user's body may include hands, arms, a torso, or legs. The feature points of the image may refer to points capable of expressing characteristics of the object (e.g., a shape of the object, a size of the object, and a position of the object). For example, the feature points may refer to points recognized, by the electronic device 1000, as the object (e.g., eyes or a nose) constituting the user's face. According to an embodiment, the metadata generator 1073 that is software- or hardware-implemented on a processor (e.g., the processor 1020 of FIG. 10A) of the electronic device 1000 may extract feature points of the object from the image acquired by the image acquisition unit 1051.

According to various embodiments, the electronic device 1000 may group at least a part of the extracted feature points, may acquire information of variables including characteristics of the object based on information of the feature points, and may generate metadata including information of the variables. The variables may be variables for determining characteristics (e.g., expression of the object) of elements (e.g., elements for implementing the characteristics of the object included in an image to be rendered, which may be eyes, a nose, a mouth, or body if the object in the image is an animal) included in an image to be rendered, and information of the variables may refer to specific values of variables used to determine the characteristics (e.g., positions of the objects, sizes of the objects, directions of the objects, or rotation angles of the objects) of the objects or relationships between the objects (e.g., a distance between an object (eye) and another object (nose)). The metadata generator 1073 may generate metadata including the characteristics of the objects and the relationships between the objects, which are generated based on information of the feature points (e.g., a distance between the feature points or positions of the feature points).

According to various embodiments, variables and/or metadata including features of the objects may include values corresponding to face animation parameters (FAPs) and/or feature points defined in MPEG-4 face and body animation (MPEG-4 FBA). For example, the variables and/or metadata including the features of the objects may include data corresponding to at least a part of iris diameter (IRISD), eye separation (ES), eye-nose separation (ENS), mouth-nose separation (MN), mouth width (MW), and angle unit (AU). According to various embodiments, metadata may be configured according to syntax of FAP data.

The metadata may refer to data obtained by grouping information of the variables. The metadata generator 1073 that is software- or hardware-implemented on the processor 1020 of the electronic device 1000 may acquire information of the variables based on information of the extracted feature points, and may generate metadata based on the acquired information of the variables.

Referring to FIG. 11A, the metadata generator 1073 may extract an object 1100 from an image acquired using the camera 1062, and may extract feature points of the object 1100. Various feature point extraction algorithms may be used for a scheme of extracting the feature points. For example, the metadata generator 1073 may compare data including information (e.g., information on a shape of the feature points) related to feature points stored in the memory 130 with at least a part of the object 1100 in the image acquired using the camera 1062, and may calculate a similarity between shapes of the feature points included in the data and at least the part of the object 1100. The metadata generator 1073 may extract the feature points from at least the part of the object 1100 in response to the calculated similarity being equal to or greater than a preconfigured value.

The metadata generator 1073 may acquire information of the variables based on information of the extracted feature points. For example, the metadata generator 1073 may acquire, based on information of the feature points, information of various variables including a pupil size 1101 of the object, a distance 1103 between two eyes of the object, a distance 1105 between eyes and nose of the object, a distance 1107 between nose and mouth of the object, and a width 1109 of mouth of the object. The metadata generator 1073 may generate metadata that includes a set of the acquired information of the variables.

Figure 11B:
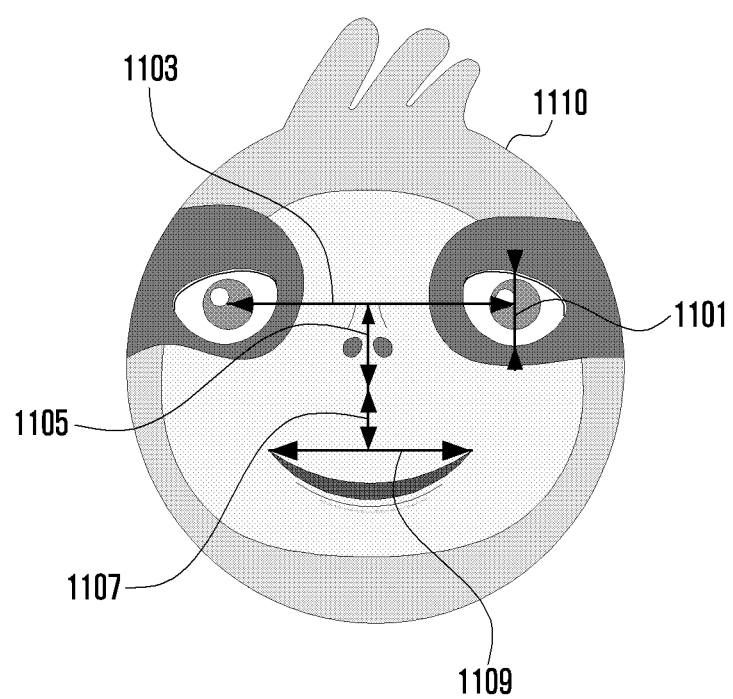
FIG. 11B is a diagram illustrating an example of rendering an image based on a model and metadata, in an electronic device according to various embodiments.

FIG. 11B is a diagram illustrating an example of rendering an image based on a model and metadata, in an electronic device according to various embodiments.

According to various embodiments, an electronic device (e.g., the electronic device 1000 of FIG. 10A) may select, based on capability information of an external electronic device (e.g., the external electronic device 320 of FIG. 3A), which is included in a response message received from the external electronic device 320, a model to perform rendering from among models implemented in the electronic device 1000, and may generate an emoji 1110, which is to be included in an image to be rendered, using the selected model.

According to various embodiments, the electronic device 1000 may store at least one model in a memory (e.g., the memory 1061 of FIG. 10A). At least one model may be differently implemented depending on a type of an object to be rendered. For example, various models including a model for rendering a dinosaur, a model for rendering a pet, and a model for rendering an entertainer may be stored in the memory 1061. The electronic device 1000 may generate the emoji 1110 included in the image to be rendered by loading the selected model on the memory 1061 and inputting, to the model, metadata received from the external electronic device 320. According to an embodiment, the image renderer 1072 implemented on the processor 1020 may receive metadata from the metadata depacketizer 1071, and may input the metadata to the model loaded on the memory 130, so as to generate the emoji 1110 included in the image to be rendered. The image renderer 1072 may render the image including the emoji 1110 using a resource provided by the processor 1020 or a resource provided by a separate graphic processing unit. The rendered image may be displayed on a display (e.g., the display 1064 of FIG. 10B).

Referring to FIG. 11B, the electronic device 1000 may select a model that renders a pet based on a response message from the external electronic device 320, and may input, to the selected model, metadata received from the external electronic device 320. For example, the electronic device 1000 may generate the emoji included in the image to be rendered, according to a scheme of inputting, to the selected model, information on a pupil size 1101 of the object, a distance 1103 between two eyes of the object, a distance 1105 between eyes and nose of the object, a distance 1107 between nose and mouth of the object, and a width 1109 of mouth of the object, which is included in the metadata. The electronic device 1000 may render the image including the generated emoji 1110, and may display the rendered image on the display 1064.

Figure 12:
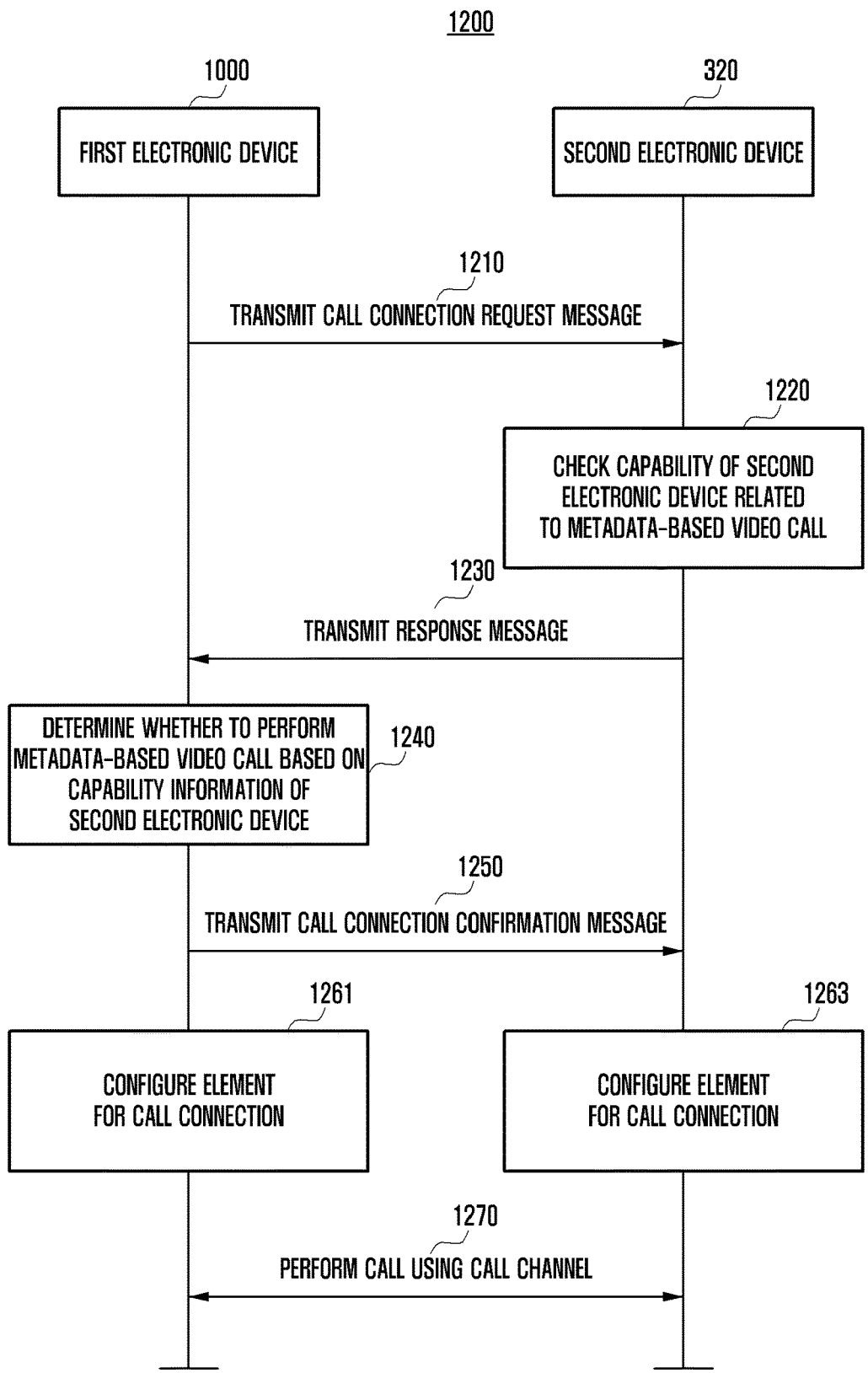
FIG. 12 is an operation flow diagram illustrating example operations of performing a call connection by the first electronic device and the second electronic device according to various embodiments.

FIG. 12 is an operation flow diagram illustrating example operations of performing a call connection by the first electronic device and the second electronic device according to various embodiments.

A first electronic device (e.g., the first electronic device 310 of FIG. 3A and FIG. 3B or the electronic device 1000 of FIG. 10A) according to various embodiments may transmit a call connection request message (e.g., the SDP invite message defined in the SDP session protocol) to a second electronic device (e.g., the second electronic device 320 of FIG. 3A and FIG. 3B) in operation 1210.

According to various embodiments, in order to determine, before a call connection is completed, whether the external electronic device 320 supports a metadata-based video call, the first electronic device 1000 may transmit, to the external electronic device 320, the call connection request message including capability information of the electronic device 1000, which is related to whether the metadata-based video call is supported. For example, the call connection request message may be implemented in the form described, for example, in Table 3 below.

TABLE 3

[-->] INVITE
m=audio 7010 RTP/AVP 110 100 98
b=AS:42
a=rtpmap:110 EVS/16000
a=rtpmap:100 AMR-WB/16000/1
a=rtpmap:98 AMR/8000/1
......
m=video 7020 RTP/AVP 112 102 34
b=AS:1280
a=rtpmap:112 H265/90000
a=imageattr:112 send [x=720, y=1280] recv [x=720, y=1280]
a=emoji_metadata:112 modelinfo=samsung_emoji_model_set_v2
facial_feature=MPEG4_facial_animation_standard
a=rtpmap:102 H264/90000
a=imageattr:102 send [x=480, y=640] recv [x=480, y=640]
a=emoji_metadata:102 modelinfo=samsung_emoji_model_set_v2
facial_feature=MPEG4_facial_animation_standard
a=rtpmap:34 H263/90000
a=imageattr:34 send [x=176, y=144] recv [x=176, y=144]

Referring to Table 3, the call connection request message may include: information indicating that the first electronic device 310 supports the metadata-based video call (a=emoji_metadata); information of a model that can be used in performing a metadata-based emoji video call (modelinfo=Samsung_emoji_model_set_v2); or standard information of metadata (facial_feature=MPEG4_facial_animation_standard).

According to various embodiments, in operation 1220, the second electronic device 320 may check capability information of the second electronic device 320 related to the metadata-based video call.

According to various embodiments, the second electronic device 320 may check the capability information of the first electronic device 310, which is related to the metadata-based video call of the first electronic device 310, which is included in the call connection request message, and the second electronic device 320 may select at least one video call scheme supported by the second electronic device 320 from among checked video call schemes.

According to various embodiments, in operation 1230, the second electronic device 320 may transmit a response message (e.g., an SDP 200 OK message defined in the SDP protocol) to the first electronic device 310.

According to various embodiments, the response message may include capability of the second electronic device 320, which is related to the metadata-based video call. For example, the response message may include at least one of an indicator indicating whether the metadata-based video call is supported, an indicator indicating model information used for the metadata-based video call, or an indicator indicating standard information used to generate metadata. For example, the response message may be implemented in the form described, for example, in Table 4 below.

TABLE 4

[<--] SIP/2.0 200 OK
m=audio 12350 RTP/AVP 100
b=AS:41
a=rtpmap:100 AMR-WB/16000/1
......
m=video 15490 RTP/AVP 102
b=AS:640
a=rtpmap:102 H264/90000
a=imageattr:102 send [x=480, y=640] recv [x=480, y=640]
a=emoji_metadata:102 modelinfo=samsung_emoji_model_set_v2
facial_feature=MPEG4_facial_animation_standard Referring to Table 4, the response message may include: an indicator indicating whether the second electronic device 320 supports the metadata-based video call (a=emoji_metadata); information on a model used when the metadata-based video call is performed (modelinfo+Samsung_emoji_model_set_v2); and standard information used when metadata is generated (facial_feature=MPEG4_facial_animation_standard).

According to various embodiments, in operation 1240, the first electronic device 1000 may determine whether to perform the metadata-based video call, based on the capability information of the second electronic device 320.

According to various embodiments, the first electronic device 1000 may confirm an indicator indicating that the metadata-based video call is supported, which is included in the response message, and may determine to perform the metadata-based video call.

According to various embodiments, the first electronic device 1000 may confirm an indicator indicating that the metadata-based video call is not supported, which is included in the response message, and may determine not to perform the metadata-based video call. The first electronic device 1000 may determine not to perform the metadata-based video call, in response to confirming that no indicator indicating that the metadata-based video call is supported is present in the response message. If the metadata-based video call is not performed, the first electronic device 1000 may determine to perform a video call in a manner of exchanging images (or image streams) transmitted by the electronic device 1000 or the external electronic device 320.

According to various embodiments, in operation 1250, the first electronic device 1000 may transmit a call connection confirmation message (e.g., an SDP ACK message defined in the SDP session protocol) to the second electronic device 320.

According to various embodiments, the call connection confirmation message may include an indicator indicating whether to perform the metadata-based video call.

According to various embodiments, in operation 1261, the first electronic device 1000 may configure elements of the first electronic device 1000, for the call connection.

According to various embodiments, the electronic device 1000 may perform various operations for a call connection to the external electronic device 320 having received the call connection confirmation message, wherein the operations include: activating the microphone 311 to generate audio data; activating the camera 341 to generate image data; activating a model configured to perform rendering, which is included in a metadata-based video call scheme; or controlling the communication module 1010 to transmit or receive data for call channel establishment.

According to various embodiments, in operation 1263, the second electronic device 320 may configure elements of the second electronic device 320, for the call connection.

According to various embodiments, in response to determining to perform the metadata-based video call, the second electronic device 320 may activate elements (e.g., the metadata depacketizer 1071 of FIG. 10B, the image renderer 1072 of FIG. 10B, the metadata generator 1073 of FIG. 10B, or the metadata packetizer 1074 of FIG. 10B) necessary for performing the metadata-based video call. Activating of the model for the metadata-based video call by the second electronic device 320 may include, for example, loading the model (modeling data) stored in the nonvolatile memory 134, in the volatile memory 132 by the electronic device (e.g., the video call application 146 and the image renderer).

According to various embodiments, in operation 1270, the first electronic device 1000 and the second electronic device 320 may complete the call connection and may perform a call using a call channel.

According to various embodiments, the first electronic device 1000 and the second electronic device 320 may transmit and/or receive metadata via the call channel. The first electronic device 1000 or the second electronic device 320 may generate the emoji 1110 included in the image to be rendered, by inputting the received metadata into the model loaded in the memory 130. The first electronic device 1000 and the second electronic device 320 may display, on the display 1061, an image generated by rendering the image including the emoji 1110. The first electronic device 1000 and the second electronic device 320 may implement a video call, in which data consumption is relatively low, via a video call in a manner of exchanging metadata having a capacity smaller than that of an image stream.

According to various example embodiments, an electronic device may include: a communication module comprising communication circuitry configured to transmit and/or receive data using a call channel established via a call connection to an external electronic device; and a processor, wherein the processor is configured to control the electronic device to: transmit a call connection request message to establish a call channel between an external electronic device and the electronic device; receive a response message from the external electronic device; determine whether to perform, via the call connection, a metadata-based video call using an image including an emoji generated based on metadata, based on the capability information of the external electronic device related to the call connection and included in the response message; transmit, to the external electronic device, a call connection confirmation message indicating whether to perform the metadata-based video call; and control the communication module to complete establishing the call channel, wherein the call connection request message includes capability information of the electronic device related to whether to support the metadata-based video call.

In the electronic device according to various example embodiments, the capability information of the electronic device may include an indicator configured to indicate whether an element of the electronic device, which is configured to perform the metadata-based video call, is present.

In the electronic device according to various example embodiments, the element of the electronic device may include a model that generates an emoji based on the metadata.

In the electronic device according to various example embodiments, the call connection request message may include identification information of at least one model which is supportable by the electronic device.

In the electronic device according to various example embodiments, the response message may include identification information of at least one model which is supportable by the external electronic device.

In the electronic device according to various example embodiments, the processor may be configured to control the electronic device to: after establishment of the call channel is completed, receive data for generating an image from an external electronic device that supports the metadata-based video call; generate an emoji corresponding to the metadata by inputting the data to the model; and output the image including the generated emoji on a display.

In the electronic device according to various example embodiments, the processor may be configured to control the electronic device to: receive an input (e.g., a user input) requesting a change of the model based on being connected to the external electronic device via the call channel, and transmit, to the external electronic device, an indicator indicating the change of the model.

In the electronic device according to various example embodiments, the processor may be configured to control the electronic device to: receive, after establishing the call channel is completed, image data from an external electronic device that does not support rendering based on the metadata, and output the image data on the display.

Figure 13:
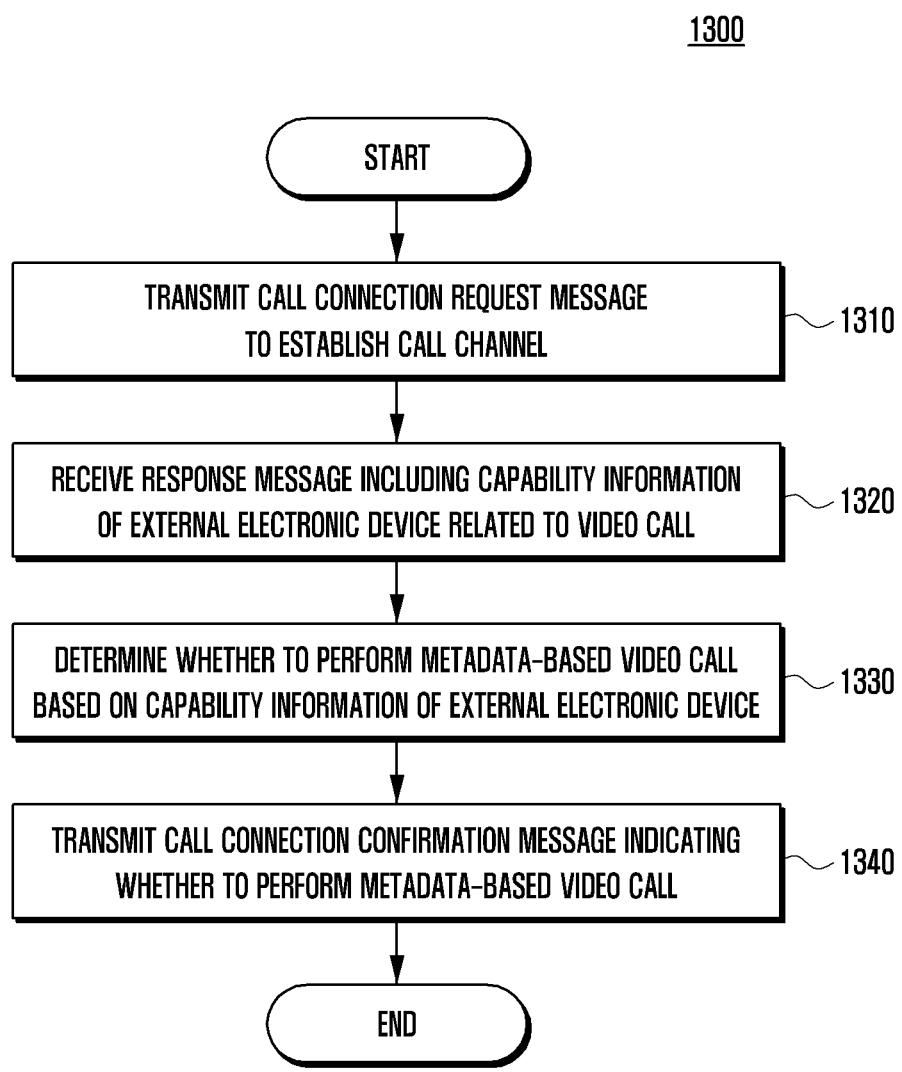
FIG. 13 is a flowchart illustrating an example operation method of an electronic device according to various embodiments.

FIG. 13 is a flowchart illustrating an example operation method 1300 of an electronic device according to various embodiments.

According to various embodiments, in operation 1310, an electronic device (e.g., the electronic device 1000 of FIG. 10A) may transmit a call connection request message to establish a call channel.

According to various embodiments, in order to determine, before a call connection is completed, whether the external electronic device 320 supports a metadata-based video call, the processor 1020 may transmit, to the external electronic device 320, the call connection request message including capability information of the electronic device 1000, which is related to whether the metadata-based video call is supported.

According to various embodiments, the capability information of the electronic device 1000 may include information indicating whether an element of the electronic device 1000 required in a metadata-based video call scheme, is present. According to an embodiment, the element of the electronic device 1000 may include a model that renders metadata, and the capability information of the electronic device 1000 may include information indicating whether the model that renders the metadata is present in the electronic device 1000.

According to various embodiments, the call connection request message may include identification information of the model that renders the metadata, in the metadata-based video call scheme. The identification information of the model may include version information of the model, manufacturer information of the model, and information indicating a standard (e.g., MPEG-4 face and body animation) used by the model.

According to various embodiments, in operation 1320, the electronic device 1000 may receive a response message including capability information of the external electronic device 320 related to a video call.

According to various embodiments, the response message may be implemented in the form of an SDP 200 OK message defined in the SDP protocol.

According to various embodiments, the response message transmitted by the external electronic device 320 may include the capability information of the external electronic device 320, which is related to the call connection.

According to various embodiments, the capability information of the external electronic device 320 may include information on elements (e.g., software-implemented elements (e.g., a model to render metadata) or hardware-implemented elements (e.g., a graphic processing unit (GPU)) that support the metadata-based video call scheme performed between the external electronic device 320 and the electronic device 1000.

According to various embodiments, in operation 1330, the electronic device 1000 may determine whether to perform the metadata-based video call, based on the capability information of the external electronic device 320.

According to various embodiments, the processor 1020 may check the capability information of the external electronic device 320, which is included in the response message, may determine whether the external electronic device 320 can support the metadata-based video call, or may check, if the metadata-based video call is supported, information of the model used for the metadata-based video call or standard information to be used for generating metadata that is to be used for the metadata-based video call.

According to various embodiments, in operation 1340, the electronic device 1000 may transmit a call connection confirmation message indicating whether to perform the metadata-based video call. For example, the call connection confirmation message may be implemented in the form of an SDP ACK message defined in the SDP session protocol.

According to various embodiments, the electronic device 1000 may perform various operations for a call connection to the external electronic device 320 having received the call connection confirmation message, wherein the operations include: activating the microphone 311 to generate audio data; activating the camera 341 to generate image data; activating a model that generates an emoji (e.g., the emoji 1110 of FIG. 11B) to be included in an image to be rendered, which is included in the metadata-based video call scheme; or controlling the communication module 1010 to transmit or receive data for call channel establishment.

Figure 14:
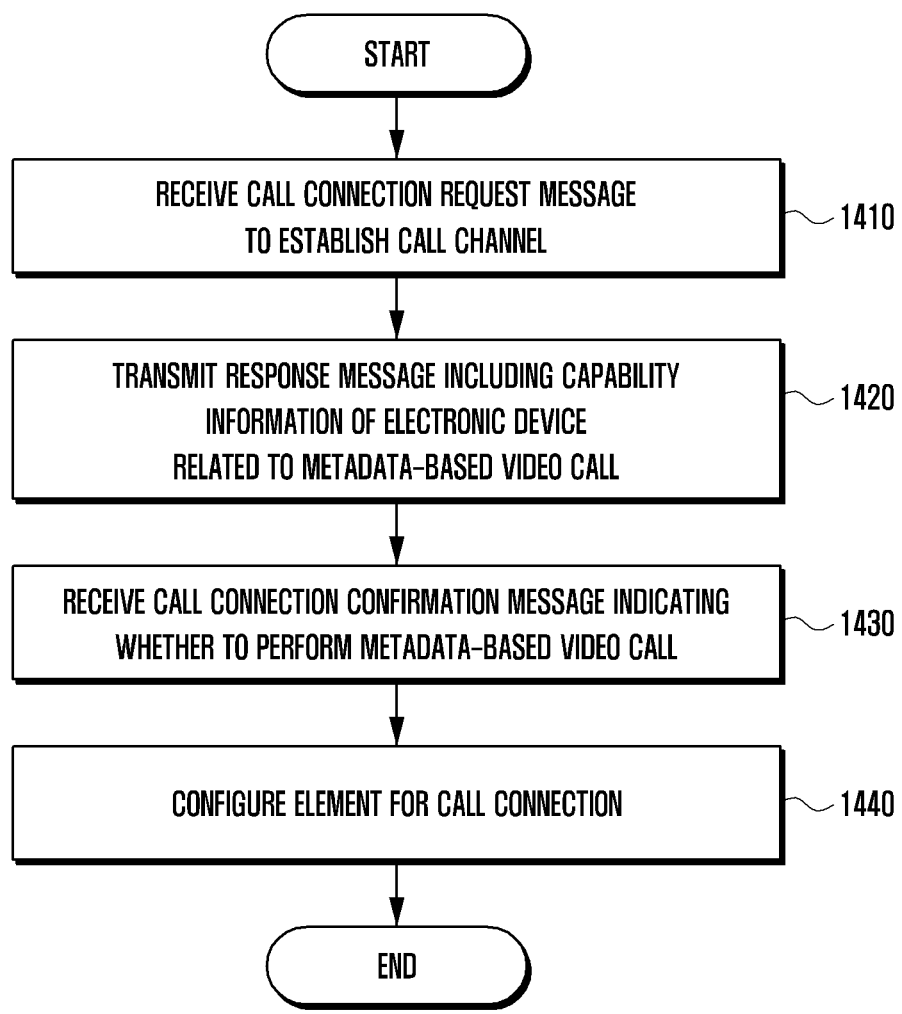
FIG. 14 is a flowchart illustrating an example operation method of an electronic device according to various embodiments.

FIG. 14 is a flowchart illustrating an example operation method 1400 of an electronic device according to various embodiments.

According to various embodiments, in operation 1410, an electronic device (e.g., the second electronic device 320 of FIG. 3A) may receive a call connection request message to establish a call channel from an external electronic device (e.g., the electronic device 1000 of FIG. 10A). For example, the call connection request message may be implemented in the form of an SDP invite message defined in SDP.

According to various embodiments, the call connection request message may include: information indicating that the first electronic device 310 supports a metadata-based video call; information of a model that can be used in performing a metadata-based emoji video call; or standard information of metadata.

According to various embodiments, in operation 1420, the electronic device 320 may transmit, to the external electronic device 1000, a response message including capability information of the electronic device 320 related to the metadata-based video call. For example, the response message may be implemented in the form of an SDP 200 OK message defined in the SDP protocol.

According to various embodiments, the response message may include the capability information of the electronic device 320, which is related to the metadata-based video call. For example, the response message may include at least one of an indicator indicating whether the metadata-based video call is supported, an indicator indicating model information used for the metadata-based video call, or an indicator indicating standard information used to generate metadata.

According to various embodiments, in operation 1430, the electronic device 320 may receive, from the external electronic device 1000, a call connection confirmation message that indicates whether to perform the metadata-based video call. For example, the call connection confirmation message may be implemented in the form of an SDP ACK message defined in the SDP session protocol.

According to various embodiments, the call connection confirmation message may be implemented in the form of the SDP ACK message defined in the SDP session protocol. The call connection confirmation message may include an indicator indicating whether to perform the metadata-based video call.

According to various embodiments, in operation 1440, the electronic device 320 may configure elements for the call connection.

According to various embodiments, in response to determining to perform the metadata-based video call, the electronic device 320 may activate elements (e.g., the metadata depacketizer 1071 of FIG. 10B, the image renderer 1072 of FIG. 10B, the metadata generator 1073 of FIG. 10B, or the metadata packetizer 1074 of FIG. 10B) necessary for performing the metadata-based video call.

An operation method of an electronic device according to various example embodiments may include: transmitting a call connection request message to establish a call channel between an external electronic device and the electronic device; receiving a response message from the external electronic device; based on capability information of the external electronic device related to the call connection and included in the response message, determining whether to pre-process a content transmitted via the call connection using a transmission filter configured to change a quality of the content; transmitting, to the external electronic device, a call connection confirmation message indicating whether to pre-process the content; and completing establishing the call channel, wherein the call connection request message includes capability information of the electronic device related to the transmission filter.

In the operation of the electronic device according to various example embodiments, the capability information of the electronic device may include an indicator configured to indicate whether an element of the electronic device, which is configured to process the transmission filter, is present.

In the operation method of the electronic device according to various example embodiments, the element of the electronic device may include a neural processing unit (NPU).

In the operation method of the electronic device according to various example embodiments, the call connection request message may be configured to include identification information of the NPU.

In the operation method of the electronic device according to various example embodiments, the call connection request message may be configured to include identification information of the transmission filter.

In the operation method of the electronic device according to various example embodiments, the call connection request message may include an indicator that indicates whether processing of the content based on the transmission filter is supported.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various example embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. One of ordinary skill in the art will understand that various changes in form and detail may be made without departing from the true spirit and full scope of the disclosure, including the appended claims and their equivalents.

What is claimed is:

1. An electronic device comprising:
 a communication module comprising communication circuitry configured to transmit or receive data using a call channel established via a call connection to an external electronic device; and
 a processor, wherein the processor is configured to control the electronic device to:
 transmit a call connection request message to establish a call channel between an external electronic device and the electronic device;
 receive a response message from the external electronic device, the response message including capability information of the external electronic device related to the call connection;

based on the capability information of the external electronic device related to the call connection included in the response message, determine whether to pre-process a content transmitted via the call connection, using a transmission filter configured to change a quality of the content before being encoded for transmission to the external electronic device;

transmit, to the external electronic device, a call connection confirmation message indicating whether to post-process content received by the external electronic device after decoding the content; and control the communication module to complete establishing the call channel, wherein the connection request message comprises capability information of the electronic device related to the transmission filter.

2. The electronic device of claim 1, wherein the capability information of the electronic device comprises an indicator indicating whether an element of the electronic device, which is configured to process the transmission filter is present.

3. The electronic device of claim 2, wherein the element of the electronic device comprises a neural processing unit (NPU) comprising processing circuitry and/or executable program elements.

4. The electronic device of claim 3, wherein the call connection request message includes identification information of the NPU.

5. The electronic device of claim 1, wherein the call connection request message includes identification information of the transmission filter.

6. The electronic device of claim 5, wherein the capability information of the electronic device comprises a resolution or a sampling rate of a content processible using the transmission filter.

7. The electronic device of claim 1, wherein the call connection request message comprises an indicator indicating whether processing of the content based on the transmission filter, is supported.

8. The electronic device of claim 1, wherein the processor is configured to:
determine whether a reception filter corresponding to the transmission filter is present in the external electronic device, based on the response message; and
determine whether to use the transmission filter, based on a result of the determination.

9. The electronic device of claim 7, wherein the processor is configured to control the electronic device to: activate, before the call connection is completed, the transmission filter and an element configured to control the transmission filter, in response to determining to use the transmission filter.

10. An electronic device comprising:
a communication module comprising communication circuitry configured to transmit and/or receive data using a call channel established via a call connection to an external electronic device; and
a processor, wherein the processor is configured to control the electronic device to:
receive a call connection request message to establish a call channel between an external electronic device and the electronic device;
transmit, to the external electronic device, a response message comprising capability information of the electronic device related to a reception filter for post-processing of a content received via the call connection after being decode;

receive, from the external electronic device, a call connection confirmation message comprising an indicator indicating whether to pre-process the content using a transmission filter corresponding to the reception filter before being encoded for transmission to the external electronic device; and
activate the reception filter based on the indicator.

11. The electronic device of claim 10, wherein the capability information of the electronic device comprises an indicator indicating whether an element of the electronic device configured to process the reception filter, is present, and
wherein the element of the electronic device comprises a neural processing unit (NPU) comprising processing circuitry and/or executable program elements.

12. The electronic device of claim 10, wherein the response message comprises an indicator indicating whether processing of the content based on the reception filter or identification information of the reception filter is supported.

13. An electronic device comprising:
a communication module comprising communication circuitry configured to transmit and/or receive data using a call channel established via a call connection to an external electronic device; and
a processor, wherein the processor is configured to control the electronic device to:
transmit a call connection request message to establish a call channel between an external electronic device and the electronic device;
receives a response message from the external electronic device, the response message including capability information of the external electronic device related to the call connection;
based on the capability information of the external electronic device related to the call connection included in the response message, determine whether to perform, via the call connection, a metadata-based video call using an image comprising an emoji generated based on metadata;
transmit, to the external electronic device, a call connection confirmation message indicating whether to perform the metadata-based video call; and
control the communication module to complete establishing of the call channel, wherein the call connection request message comprises capability information of the electronic device, the capability information indicating whether the metadata-based video call is supported.

14. The electronic device of claim 13, wherein the capability information of the electronic device comprises an indicator indicating whether an element of the electronic device configured to perform the metadata-based video call is present.

15. The electronic device of claim 14, wherein the element of the electronic device comprises a model configured to generate an emoji based on the metadata.

16. The electronic device of claim 13, wherein the call connection request message comprises identification information of at least one model supportable by the electronic device.

17. The electronic device of claim 13, wherein the response message comprises identification information of at least one model supportable by the external electronic device.

18. The electronic device of claim 13, wherein the processor is configured to control the electronic device to:

based on establishment of the call channel being completed, receive data for generation of an image from an external electronic device that supports the metadata-based video call;

generate an emoji corresponding to the metadata by inputting the data to a model; and output the image comprising the generated emoji on a display.

19. The electronic device of claim 18, wherein the processor is configured to control the electronic device to:

receive an input configured to request a change of the model, based on being connected to the external electronic device via the call channel; and transmit an indicator indicating the change of the model to the external electronic device.

20. The electronic device of claim 13, wherein the processor is configured to control the electronic device to:

based on establishment of the call channel being completed, receive image data from an external electronic device which does not support rendering based on the metadata; and output the image data on a display.

\* \* \* \* \*